US012611969B2

(12) United States Patent
Meier et al.

(10) Patent No.: US 12,611,969 B2
(45) Date of Patent: Apr. 28, 2026

(54) SEAT ARRANGEMENT FOR A MEANS OF TRANSPORT

(71) Applicant: GRAMMER AG, Ursensollen (DE)

(72) Inventors: Dominik Meier, Munich (DE);
Sebastian Wegmann, Regensburg (DE)

(73) Assignee: GRAMMER AG, Ursensollen (DE)

( * ) Notice: Subject to any disclaimer, the term of this patent is extended or adjusted under 35 U.S.C. 154(b) by 194 days.

(21) Appl. No.: 18/108,747

(22) Filed: Feb. 13, 2023

(65) Prior Publication Data

US 2023/0191956 A1 Jun. 22, 2023

Related U.S. Application Data

(63) Continuation of application No. 17/020,990, filed on Sep. 15, 2020, now Pat. No. 11,772,521.

(51) Int. Cl.
| | |
|---|---|
| *A47C 9/02* | (2006.01) |
| *A47C 7/28* | (2006.01) |
| *B60N 2/02* | (2006.01) |
| *B60N 2/20* | (2006.01) |
| *B60N 2/64* | (2006.01) |

(Continued)

(52) U.S. Cl.
CPC ............ *B60N 2/0292* (2013.01); *A47C 7/282* (2013.01); *A47C 9/025* (2013.01); *B60N 2/203* (2013.01); *B60N 2/643* (2013.01); *B60N 2/68* (2013.01); *B61D 33/0028* (2013.01);
(Continued)

(58) Field of Classification Search
CPC ...... A47C 9/025; A47C 7/282; B60N 2/0292; B60N 2002/247; B64D 11/0648
See application file for complete search history.

(56) References Cited

U.S. PATENT DOCUMENTS

| | | | |
|---|---|---|---|
| 3,762,764 A | 10/1973 | McJunkin | |
| 4,375,300 A * | 3/1983 | Long .................. | B64D 11/0648 |
| | | | 297/445.1 |

(Continued)

FOREIGN PATENT DOCUMENTS

| | | |
|---|---|---|
| CN | 104260890 | 1/2015 |
| CN | 105459859 | 4/2016 |

(Continued)

OTHER PUBLICATIONS

Extended Search Report for European Patent Application No. 20192482.6, dated Dec. 16, 2020, pages.

(Continued)

*Primary Examiner* — Timothy J Brindley
(74) *Attorney, Agent, or Firm* — Sheridan Ross P.C.

(57) ABSTRACT

The invention relates to a seat arrangement for a means of transport, in particular for a means of passenger transport, wherein the seat arrangement can be arranged on the means of transport by means of a fastening device, wherein the seat arrangement is intended and suitable for providing a sitting position at standing height, wherein the seat arrangement comprises at least one frame element, which is arranged on the fastening device by means of at least one mounting shaft, wherein the at least one mounting shaft is received in at least one receiving device of the fastening device, wherein the at least one receiving device is arranged on a fastening element which is configured as an arm element extending along a height axis.

22 Claims, 18 Drawing Sheets

(51) Int. Cl.
_B60N 2/68_ (2006.01)
_B61D 33/00_ (2006.01)
_B60N 2/24_ (2006.01)
_B64D 11/06_ (2006.01)

(52) U.S. Cl.
CPC .... _B61D 33/0078_ (2013.01); _B60N 2002/247_ (2013.01); _B64D 11/06_ (2013.01)

(56) References Cited

U.S. PATENT DOCUMENTS

| | | | | |
|---|---|---|---|---|
| 4,498,649 A * | 2/1985 | Toll | B64D 11/06 |
| | | | 297/DIG. 2 |
| 4,869,554 A | 9/1989 | Abu-Isa et al. | |
| 5,364,151 A | 11/1994 | Yurasits | |
| 5,463,972 A | 11/1995 | Gezari et al. | |
| 5,470,128 A * | 11/1995 | Kerkham | A47C 13/005 |
| | | | 297/440.14 |
| 6,435,618 B1 | 8/2002 | Kawasaki | |
| 6,746,086 B1 * | 6/2004 | Foster | A47C 11/005 |
| | | | 297/440.14 |
| 7,887,136 B2 | 2/2011 | Zoell | |
| 8,220,872 B2 | 7/2012 | Hong | |
| 9,060,614 B1 * | 6/2015 | Gibilterra | A47C 3/00 |
| 10,967,771 B2 | 4/2021 | Seibold | |
| 11,285,845 B2 | 3/2022 | Meier et al. | |
| 11,407,333 B2 | 8/2022 | Meier et al. | |
| 11,458,864 B2 | 10/2022 | Meier et al. | |
| 12,350,217 B2 * | 7/2025 | Behrendt | A61H 1/0222 |
| 2002/0149249 A1 | 10/2002 | Horn | |
| 2003/0209929 A1 * | 11/2003 | Muin | B64D 11/0649 |
| | | | 297/331 |
| 2007/0069558 A1 | 3/2007 | Herold, III et al. | |
| 2012/0261954 A1 | 10/2012 | Khalil et al. | |
| 2014/0159444 A1 | 6/2014 | Guering | |
| 2016/0206102 A1 | 7/2016 | Aldrich et al. | |
| 2019/0001846 A1 | 1/2019 | Jackson et al. | |
| 2019/0359091 A1 | 11/2019 | Yamauchi et al. | |
| 2020/0165122 A1 | 5/2020 | Salzmann | |
| 2020/0383481 A1 | 12/2020 | Cieszko et al. | |
| 2021/0078453 A1 | 3/2021 | Meier et al. | |
| 2024/0148149 A1 * | 5/2024 | Kapij | A47C 3/18 |

FOREIGN PATENT DOCUMENTS

| | | | | |
|---|---|---|---|---|
| CN | 107028402 | 8/2017 | | |
| CN | 208101990 | 11/2018 | | |
| CN | 109017493 | 12/2018 | | |
| DE | 19912182 | 9/2000 | | |
| DE | 102007038829 | 2/2009 | | |
| DE | 102010000259 | 8/2011 | | |
| DE | 102016202089 | 8/2017 | | |
| DE | 102017008684 | 3/2018 | | |
| DE | 202024000606 U1 * | 6/2024 | | A47C 9/025 |
| EP | 0176423 | 4/1986 | | |
| EP | 2287040 | 2/2011 | | |
| EP | 3459852 | 3/2019 | | |
| FR | 3040030 | 12/2018 | | |
| GB | 2530554 | 3/2016 | | |
| JP | H08-131295 | 5/1996 | | |
| WO | WO 2008/124859 | 10/2008 | | |
| WO | WO 2016/184745 | 11/2016 | | |
| WO | WO 2021/043531 | 3/2021 | | |

OTHER PUBLICATIONS

Official Action with machine translation for German Patent Application No. 102020109182.6, dated Jan. 11, 2022, 7 pages.
Extended Search Report for European Patent Application No. 20192488.3, dated Dec. 22, 2020, 6 pages.
Official Action with machine translation for German Patent Application No. 102020109174.5, dated Jan. 11, 2022, 8 pages.
Extended Search Report for European Patent Application No. 20192491.7, dated Jan. 12, 2021, pages.
Extended Search Report for European Patent Application No. 21159185.4, dated May 7, 2021, 5 pages.
Official Action with machine translation for European Patent Application No. 21159185.4, dated Feb. 17, 2022, 6 pages.
Official Action with machine translation for German Patent Application No. 102020109167.2, dated Jan. 11, 2022, 8 pages.
Extended Search Report for European Patent Application No. 20192494.1, dated Dec. 16, 2020, 6 pages.
Official Action with machine translation for German Patent Application No. 102020109160.5, dated Jan. 11, 2022, 9 pages.
Official Action for U.S. Appl. No. 17/020,962, dated Jun. 16, 2021 5 pages Restriction Requirement.
Official Action for U.S. Appl. No. 17/020,962, dated Oct. 18, 2021 11 pages.
Official Action for U.S. Appl. No. 17/020,974, dated Jun. 16, 2021 5 pages Restriction Requirement.
Official Action for U.S. Appl. No. 17/020,974, dated Oct. 21, 2021 11 pages.
Official Action for U.S. Appl. No. 17/020,996, dated Jun. 7, 2021 12 pages.
Official Action for U.S. Appl. No. 17/020,996, dated Sep. 10, 2021 9 pages.
Notice of Allowance for U.S. Appl. No. 17/020,996, dated Dec. 29, 2021 7 pages.
Notice of Allowance for U.S. Appl. No. 17/020,974, dated May 2, 2022 5 pages.
Notice of Allowance for U.S. Appl. No. 17/020,962, dated May 9, 2022 8 pages.
Official Action for U.S. Appl. No. 17/020,990, dated Dec. 12, 2022 9 pages.
Official Action for U.S. Appl. No. 17/020,990, dated May 24, 2023 8 pages.
Notice of Allowance for U.S. Appl. No. 17/020,990, dated Aug. 15, 2023.
Official Action with English Translation for China Patent Application No. 202010973591.6, dated Jul. 29, 2023, 11 pages.
Official Action (with machine translation) for China Patent Application No. 202410228492.3, dated Mar. 13, 2026, 24 pages.

* cited by examiner

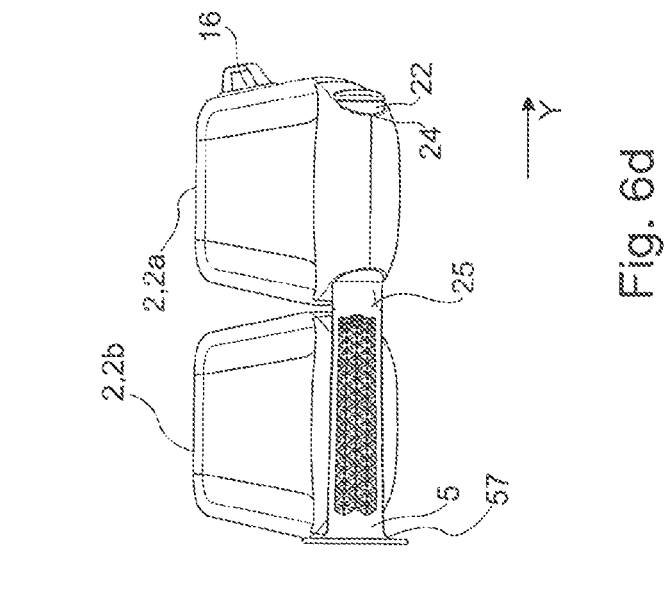
Fig. 6d
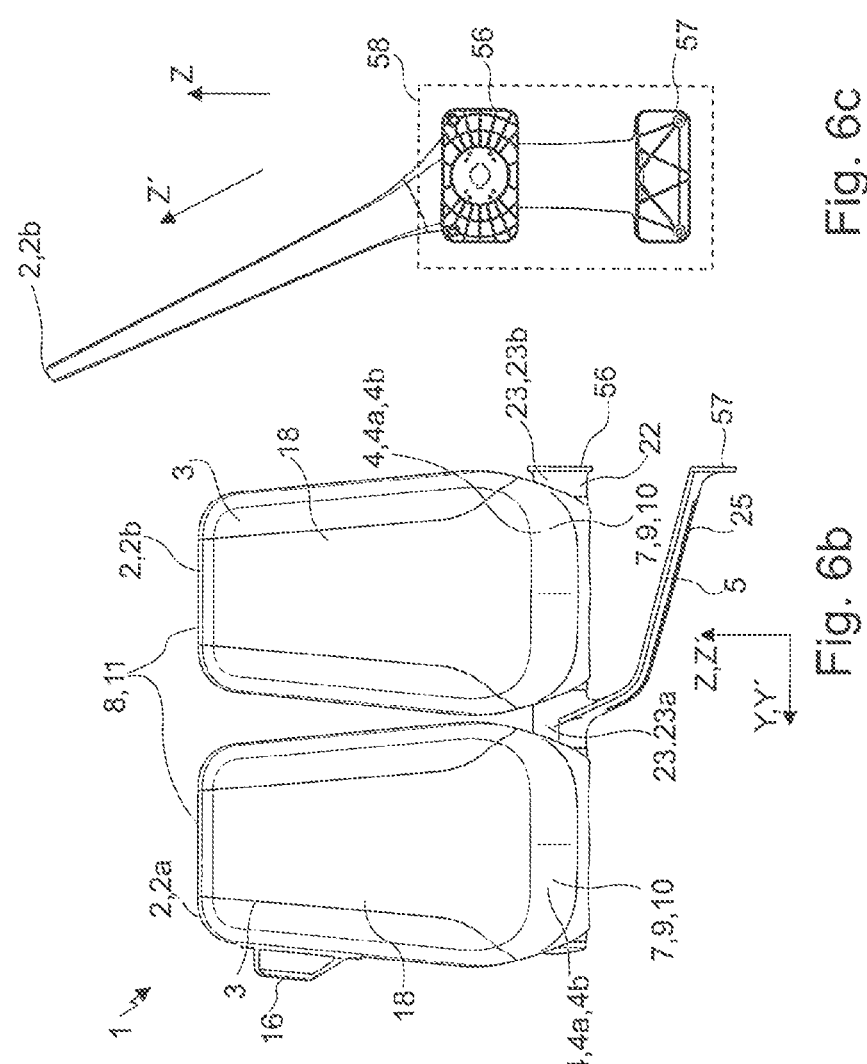
Fig. 6c
Fig. 6b

SEAT ARRANGEMENT FOR A MEANS OF TRANSPORT

CROSS-REFERENCE TO RELATED APPLICATIONS

This application is a continuation application of U.S. patent application Ser. No. 17/020,990 filed Sep. 15, 2020, which claims the benefit of German Patent Application No. 10 2019 124 895.7 filed Sep. 16, 2019; German Patent Application No. 10 2019 124 897.3 filed Sep. 16, 2019; German Patent Application No. 10 2019 124 898.1 filed Sep. 16, 2019; German Patent Application No. 10 2019 124 901.5 filed Sep. 16, 2019; and German Patent Application No. 10 2020 109 167.2 filed Apr. 2, 2020, the entire contents of each of which are incorporated herein by reference in their entireties.

FIELD

The invention relates to a seat arrangement for a means of transport, in particular for a means of passenger transport, in which the seat arrangement is arranged on the means of transport by means of a fastening device.

BACKGROUND

Such means of transport are provided and suitable for being able to transport a plurality of people and are, for example, rail vehicles or airplanes. Corresponding rail vehicles are, for example, local and/or long-distance trains, suburban trains, subways, and the like. There is a need to optimise the use of the available space in such means of transport as much as possible. As many travellers as possible should be able to be accommodated in one means of transport. By providing conventional seat arrangements in which the user takes a seat in the conventional sitting posture with bent legs, a user takes up a comparatively large amount of space in the means of transport. In comparison, by providing standing locations, a considerably larger number of people can fit into the means of transport. However, a standing location also often implies an unacceptable loss of travel comfort, especially on longer journeys. Another disadvantage of the previous seat arrangements is that they cannot be modified with regard to the needs of the users. For example, the orientation of the seats cannot be changed. An adjustment of the orientation, for example to the direction of travel of the means of transport, is generally not possible. Likewise, seating groups are usually provided in which two pairs of seats face one another, or in which the pairs of seats are arranged in a row, one behind the other. Accordingly, an adjustment to the needs of small travel groups or families is not possible using such seating groups.

SUMMARY

The object of the present invention is to provide a seat arrangement which overcomes the disadvantages mentioned hereinabove. Furthermore, it is the object of the invention to provide an interior device of a means of transport which overcomes the disadvantages mentioned hereinabove.

One substantial aspect of the invention is to provide a seat arrangement for a means of transport, in particular for a means of passenger transport, in which the seat arrangement can be arranged on or in the means of transport by means of a fastening device. The seat arrangement is provided and suitable for providing a sitting position at standing height, with the seat arrangement comprising at least one frame element, which is arranged on the fastening device by means of at least one mounting shaft, in which case the at least one mounting shaft is received in at least one receiving device of the fastening device, with the at least one receiving device being arranged on a fastening element which is configured as an arm element extending along a height axis (Z).

In the following, a coordinate system with a height axis (X), a width axis (Y), and a depth axis (X) is used for the seat arrangement. A coordinate system with a height axis (X'), a width axis (Y'), and a depth axis (X') is used for the at least one frame element. The respective axes can also have two directions.

The frame element preferably comprises an upper region for supporting the back and at least one seat region integrated in the at least one frame element. The at least one frame element accordingly takes on the function of a backrest and, likewise, the function of a seat part. Accordingly, an extremely simple and inexpensive seat arrangement is provided. The first and the second seat regions of the at least one frame element preferably have an extension along a depth axis (X') which is between 10 cm and 50 cm, more preferably between 15 cm and 40 cm. Due to the configuration with a seat region integrated in the at least one frame element, the seat arrangement thus already has a smaller extent in a depth direction of the seat arrangement or of the means of transport than the conventional seat arrangements. Since the at least one frame element already comprises an integrated seat region, no additional seat part is necessary or provided. Furthermore, the seat region is arranged at a height that allows sitting or leaning at standing height. Such seat arrangements are also referred to as a sit-stand seat. Due to the advantageous configuration as a sit-stand seat, the occupant of the seat arrangement does not assume a conventional sitting posture. Rather, the occupant assumes a sitting posture in the seat arrangement which approximately corresponds to a standing posture. This sitting posture requires less space than the conventional sitting posture, in which the legs are angled at approximately a right angle. The advantageous seat arrangement thus has a substantially smaller depth than a conventional seat. The passengers of the means of transport are therefore offered an extremely simple, yet comfortable, option for sit-standing. In contrast to standing, the pressure on the legs and blood circulation is reduced when sit-standing. This promotes healthy "dynamic sitting". Accordingly, seating options are offered to as many travellers as possible, whereby they also provide the travellers with an acceptable level of travel comfort. Furthermore, the space available in the means of transport is optimised as much as possible. The seating region is advantageously arranged at a height between 40 cm and 150 cm, more preferably at a height between 40 cm and 130 cm. The seat height can advantageously be matched to the intended target persons. A seat arrangement which is intended for children or the elderly would preferably have a seat height in a range between 40 cm and 60 cm. A seat arrangement for adults would rather have a height in a range between 80 cm and 150 cm, more preferably in a range between 80 cm and 130 cm.

According to a preferred embodiment, the at least one frame element is formed by a lower portion and an upper portion. The at least one frame element preferably has a base area which extends along a height axis (Z') and along a width axis (Y'). This base area is preferably designed as a polygon. The base area is preferably designed as a square. The base area is preferably substantially designed as a rectangle or is substantially designed as a trapezoid. The term "substantially" used should be construed as including minor tolerance deviations in terms of a shape of a length or an angle. Thus, the deviation may be an angle of preferably less than 10°, more preferably less than 7.5°, even more preferably less than 5°. This also applies to the term "substantially" used hereinafter. According to a further preferred embodiment, the lower portion and the upper portion of the at least one frame element form the at least one frame element integrally, in one piece, or in multiple pieces, in particular in two pieces. In the case of a one-piece design, the frame element, or the upper and the lower portion, is produced as a single and unitary part, or as a so-called monoblock. The respective portions are advantageously made of the same material. A one-piece design is understood herein to mean that, although not all portions are made from a single and unitary part, they are not only firmly connected, but are so closely connected to one another that they do not appear as a plurality of joined components and in any case can no longer be separated from one another without being destroyed.

Advantageously, the lower portion comprises at least one first transverse portion extending substantially along a width axis (Y') and one second transverse portion extending substantially along a width axis (Y'). The upper portion preferably comprises a third transverse portion extending along the width axis (Y'). The first transverse portion and the second transverse portion preferably have an extension along a depth axis (X'). This extension is advantageously increased in comparison to an extension of the third transverse portion along the depth axis. Preferably, the first and/or the second transverse portion form, at least in portions, the seat region. Preferably, the first and second transverse portions extend in opposite directions along the depth axis. The first and the second transverse portion are preferably connected to one another. The first and the second transverse portion are preferably formed integrally or in one piece. The first and the second transverse portions are advantageously spaced apart from the third transverse portion along the height axis (Z') and are connected by means of two strut elements. The first transverse portion and the second transverse portion preferably have a greater extent along a depth axis (X') than the third transverse portion. It is advantageous that the lower portion and the upper portion enclose an inner surface. Likewise, the first and the second transverse portion enclose the two strut elements and the third transverse portion the inner surface. The at least one frame element is thus substantially plate-like, in which case, at the lower end along the height axis, the first and second transverse portions having an enlarged depth extension are provided, as a result of which the seat region is formed at least in portions.

According to a further advantageous embodiment, the at least one frame element can be pivoted relative to the fastening device about a pivot axis extending along a width axis (Y', Y). The at least one frame element can therefore be pivoted as a whole with respect to a pivot axis. As a result, both the advantageous upper region for supporting the back and the advantageous integrated seat region are simultaneously pivoted or rotated about the pivot axis. In contrast, only the backrest can be pivoted about a pivot axis in conventional seat arrangements. According to a further preferred embodiment, the at least one frame element can be pivoted into at least two pivoting positions. The at least one frame element is preferably pivotable into three pivoting positions. The at least one frame element is preferably pivotable into a first pivoting position. In the first pivoting position, the frame element preferably extends substantially perpendicular to an imaginary plane which extends parallel to the floor of the means of transport. The at least one frame element is advantageously pivotable into a second pivoting position, which is inclined relative to the first pivoting position by an angle of inclination ($\alpha$). The at least one frame element is preferably pivotable into a third pivoting position, which is inclined relative to the first pivoting position by an angle of inclination ($\beta$). Advantageously, a second imaginary plane can be defined which runs perpendicular to the first imaginary plane. The at least one frame element in the first pivoting position is advantageously arranged substantially in the second imaginary plane. In the second and the third pivoting position, the at least one frame element preferably includes an angle of inclination $\alpha$ or $\beta$ with the second imaginary plane. It is advantageous hereby that the at least one frame element be inclined in directions opposite the second and the third pivoting position along a depth axis (X). The angle of inclination ($\alpha$) and the angle of inclination ($\beta$) thus advantageously have different signs ($\pm$). However, the angle of inclination ($\alpha$) and the angle of inclination ($\beta$) preferably have the same amount. The angles of inclination ($\alpha$, $\beta$) are preferably in a range between 10° and 80°, more preferably in a range between 20° and 70°, in which case the at least one frame element and the second imaginary plane include the angles of inclination ($\alpha$, $\beta$).

The at least one mounting shaft allows the at least one frame element to be pivoted or rotated about the pivot axis. The pivot axis preferably extends through or along the mounting shaft. According to a further preferred embodiment, only one mounting shaft is provided. This mounting shaft is received in at least one receiving device of the fastening device. The mounting shaft is preferably received in two receiving devices of the fastening device which are spaced apart from one another along the width axis (Y, Y'). At least one frame element is advantageously arranged between two receiving devices of the fastening device. According to a further preferred embodiment, a through channel for the mounting shaft is provided at the lower end of the at least one frame element along a height axis (Z'). The mounting shaft advantageously extends through the through channel of the at least one frame element. The through channel is preferably provided in the lower portion of the at least one frame element. The through channel can preferably extend over the entire width of the at least one frame element. The through channel preferably extends over a substantial portion along the width direction of the at least one frame element. Such a substantial portion preferably corresponds to at least half, more preferably at least three quarters of the total width of the at least one frame element. However, it would also be conceivable that the through channel is not continuously closed. Furthermore, it would be conceivable for the through channel to have at least one, preferably two, mounting regions which are formed by the at least one frame element or are arranged on the at least one frame element. In the remaining extent, the mounting shaft could preferably be exposed.

According to a further preferred embodiment, the mounting shaft is non-rotatably or mechanically rigidly connected to the fastening device, or to the at least one receiving device of the fastening device. It is advantageous that the at least one frame element is pivotable or rotatable relative to and on the mounting shaft. It would also be conceivable that the mounting shaft be connected to the at least one frame element in a rotationally fixed or mechanically rigid manner. It is advantageous that the mounting shaft be rotatably mounted in the at least one, preferably two, receiving device(s). The at least one frame element and the mounting shaft pivot, or preferably thus rotate, relative to the at least one, preferably two, receiving device(s). It would also be conceivable that two mounting shafts be provided which are arranged on the lower portion of the at least one frame element on the respective opposite sides along the width axis (Y, Y') in such a way that they protrude along the width axis (Y, Y') over the at least one frame element. The two mounting shafts are then rotatably mounted in a respective receiving device of the fastening element.

According to a further preferred embodiment, a latching apparatus is provided, by means of which the at least one frame element can be locked in at least one pivoting position. The at least one frame element can preferably be locked in at least two or at least three pivoting positions by means of the latching apparatus. Advantageously, the at least one frame element can be locked in all intended pivoting positions by means of the latching apparatus. If the at least one frame element is pivoted into the first pivoting position and preferably locked in this pivoting position, it is aligned upright and substantially arranged in the second imaginary plane, which runs perpendicular to the first imaginary plane. In this position, the seat arrangement is not occupied by a user. The effective depth of the seat arrangement in this position substantially corresponds to the sum of the depth extensions of the first and second transverse portions of the at least one frame element. The seat arrangement accordingly takes up a minimal space in the first pivoting position along the depth axis. The fact that the at least one frame element takes up very little space when the upright extension is extended makes possible, for example, effective mounting of the seat arrangement. Furthermore, in the case of a plurality of seat arrangements arranged in a row, the intermediate space can be enlarged by pivoting into the first pivoting position. According to a further advantageous embodiment, in the second pivoting position of the at least one frame element, a first seat region is formed at least by the first transverse portion. In the third pivoting position of the at least one frame element, a second seat region is preferably formed at least by the second transverse portion. The at least one frame element can advantageously be pivoted into the first pivoting position, into the second pivoting position, and into the third pivoting position, and can advantageously be latched in these pivoting positions. Due to the preferred extension of the first transverse portion and the second transverse portion in directions opposite along the depth axis (X) and due to the opposite angle of inclinations (α, β) of the at least one frame element in the second and the third pivoting positions, the first and the second seat regions are arranged along directions opposite to the depth axis (X). Such a configuration allows the seat alignment to be adapted extremely easily to the direction of travel. With some means of transport, such as rail vehicles, a change of direction can take place during travel. This can be done, for example, when entering or leaving a terminal station. However, some users are uncomfortable when travelling backwards. The orientation of the seat arrangement can be adapted in a simple manner to the direction of travel by simply pivoting, for example, from the second to the third pivoting position.

According to a further preferred embodiment, the at least one frame element can advantageously be pivoted into the first pivoting position, and the second pivoting position and can advantageously be locked in these pivoting positions. One embodiment would also be conceivable in which the at least one frame element can be pivoted into the first pivoting position and into the third pivoting position and can advantageously be locked in these pivoting positions. According to these embodiments, the seat arrangement would therefore continue to be configured for an upright pivoting position in only one seating direction. According to a further preferred embodiment, the at least one frame element can advantageously be pivoted into the second pivoting position and into the third pivoting position and can advantageously be locked in these pivoting positions. According to this embodiment, the seat arrangements would be designed for two opposite seating directions. However, an upright pivoting position for mounting would not be provided. Finally, it would be conceivable that the at least one frame element can only assume the second pivoting position or the third pivoting position and be locked or fixed in this pivoting position. Of course, it would also be conceivable that the at least one frame element can be pivoted into further pivoting positions and can be locked in these pivoting positions. Such further pivoting positions could lie between the first pivoting position and the second pivoting position or between the first pivoting position and the third pivoting position. The corresponding angles of inclination would then be smaller than said angles of inclination (α, β). This would allow the occupant to adjust the inclination of the upper portion to support the back according to their needs. According to a further advantageous embodiment, in the second pivoting position of the at least one frame element, the first seat region extends substantially parallel to the first imaginary plane, or horizontally. In the third pivoting position of the at least one frame element, the second seat region preferably extends substantially parallel to the first imaginary plane or horizontally. The first transverse portion preferably comprises an upper surface which, in the second pivoting position, extends substantially parallel to the first imaginary plane. The second transverse portion advantageously comprises an upper surface which, in the third pivoting position, extends substantially parallel to the first imaginary plane.

According to a further preferred embodiment, at least one gripping element is provided on the at least one frame element. The at least one gripping element is preferably arranged on one of the strut elements in an upper region along the height axis (Z). Accordingly, the gripping element is arranged entirely or at least in portions on the upper portion of the at least one frame element. The seat arrangement advantageously has a first outer side and a second outer side. Advantageously, the gripping element is arranged on an outer side, which, when installed in the means of transport, lies on a walkway. The gripping elements thus form a holding option for standing passengers or passengers walking by. It would be conceivable that only the first outer side lies on a walkway of the means of transport. In this case, it is advantageous if the gripping element is arranged on the first outer side of the seat arrangement. However, it would also be conceivable for a gripping element to be arranged on the first and on the second outer sides of the seat arrangement. This would be advantageous, for example, if two walkways are provided in the means of transport. However, the arrangement of the gripping elements is not limited to the arrangement with respect to the walkways. Such gripping elements can also have other functions, such as support when standing up, etc.

According to a further preferred embodiment, the seat arrangement only comprises a frame element which is arranged on the fastening device. The frame element is advantageously arranged between two receiving devices of the fastening device. Each of the receiving devices is preferably arranged on a fastening element which is suitable and provided for attaching the receiving device to the means of transport. The fastening elements advantageously include arm elements which extend along the height axis (Z) and which open into a base element. The respective arm element and the receiving device are advantageously designed integrally or in one piece. It is also advantageous that the arm elements and the base element are designed integrally or in one piece. The base element is preferably arranged centrally to and along the height axis (Z) below the frame element. The arm elements are designed to converge downwards along the height axis (Z). The arm elements and the base element are preferably designed as a flat profile. The arm elements are preferably substantially designed so as to be V-shaped. An advantageous symmetrical introduction of force into the base element can thus take place. With such a configuration, the seat arrangement can be designed so as to be extremely simple. The fastening element engages directly on the mounting shaft for the frame element. There is therefore no need for any additional components for mounting the frame element. The base element can advantageously be fixed directly to the floor of the means of transport. It would also be conceivable for the fastening device or the base element to be displaceably arranged on the floor of the means of transport by means of a guide system. According to a further embodiment, the base element comprises a footrest element, which is designed as a connecting element between arm elements extending along the width axis (Y) and is spaced apart from the base element along the height axis. It would also be conceivable that a rotating device is provided in or on the base element, by means of which a rotation of the seat arrangement is possible about an axis of rotation which extends parallel to the height axis (Z).

According to a further preferred embodiment, the seat arrangement comprises two frame elements which are arranged on the fastening device. The two frame elements are preferably arranged next to one another along the width axis (Y). The two frame elements can be of the same or different designs. Each of the two frame elements can have features according to the embodiments described in the introduction, independently of one another. As already described, a first and a second outer side of the seat arrangement can preferably be defined. If the seat arrangement comprises two frame elements, one outer side of the seat arrangement is represented by one of the two frame elements. The at least one gripping element already described can be arranged on one of the two outer sides. In an installed state, the outer side having the gripping element is advantageously located on a walkway of the means of transport. Of course it would also be conceivable to arrange at least one gripping element on both outer sides and thus on both frame elements. This is advantageous, for example, if the two outer sides point to a walkway of the means of transport in an installed state. Of course, it would also be conceivable that at least one gripping element is arranged on the two inner sides of the frame elements. These could preferably be provided in addition to the gripping elements on the outer sides.

Advantageously, the two frame elements can be pivoted independently of one another about a common pivot axis extending along a width axis (Y) relative to the fastening device. As already described, the two frame elements are preferably pivotable independently of one another by the angles of inclination (α, β) into the first, second, and third pivoting positions. According to a further advantageous embodiment, only one mounting shaft is provided. The mounting shaft advantageously extends at least over the entire width of the two frame elements. As already described, the mounting shaft extends through the through channels of the two frame elements. The mounting shaft is preferably received in at least two, preferably exactly two, receiving devices of the fastening device. Each of the receiving devices is preferably arranged on a fastening element. At least one fastening element preferably comprises an arm element extending along the height axis (Z).

According to a further preferred embodiment, a first receiving device is arranged between the two frame elements. A further second receiving device is preferably arranged on the side of one of the two frame elements, or on one of the two outer sides of the seat arrangement. According to an advantageous embodiment, the first receiving device is arranged on a fastening element which comprises an arm element extending along the height axis (Z). The second receiving device is preferably arranged on a fastening element which can be arranged on the means of transport by means of a plate-like element.

The receiving device can be arranged on a wall element of the means of transport by means of the plate-like element. The plate-like element is accordingly arranged in a fastening plane which extends substantially parallel to the second imaginary plane. The wall element of the means of transport advantageously comprises the fastening plane. Such a wall element is preferably a side wall of the means of transport. The arm element can be designed as a cantilever arm or a cantilever. The arm element preferably opens into a second plate-like element, which is also arranged in the fastening plane. The arm element accordingly extends from the fastening plane towards the first receiving device. The arm element preferably extends obliquely upwards, starting from the fastening plane, along the height axis (Z) and opens into the first receiving device. According to a further advantageous embodiment, instead of the first and second plate-like elements mentioned above, only one plate-like element is provided, which extends along the fastening plane. The arm element or the cantilever arm preferably extends from this plate-like element to the first receiving device. The second receiving device is preferably arranged on the fastening element. In other words, the aforementioned first and second plate-like elements are formed into an integral plate-like element.

According to a further embodiment, the first receiving device and the second receiving device are each arranged on a fastening element which comprises an arm element extending along the height axis (Z). Accordingly, the fastening device comprises two arm elements. The first receiving device arranged between the two frame elements is advantageously arranged on a first arm element. The second receiving device is preferably arranged on a second arm element. The second receiving device and the second arm element are advantageously arranged on an outer side of the seat arrangement. The at least one gripping element is also advantageously arranged on this outer side. By providing the second receiving device and the second arm element on the same outer side as the at least one gripping element, the forces that can be introduced into the seat arrangement can be effectively derived via the second arm element. The seat arrangement accordingly has an advantageously increased stability on the outer side of the seat arrangement. Both arm elements can advantageously be fixed to the floor of the transport device. It would also be conceivable that the arm elements are fixed to a rail arrangement. With such a configuration, the position of the seat arrangement in the means of transport can be varied. The two arm elements are inclined by an angle of inclination γ with respect to a reference axis which is perpendicular to the first imaginary plane. The angle of inclination γ is in a range between 5° and 20°, preferably in a range between 10° and 15°. According to a further advantageous embodiment, the first and/or the second arm element comprise a footrest element. The footrest element is preferably oriented parallel to the first imaginary plane.

According to a further preferred embodiment, the first receiving device and the second receiving device are each arranged on an outer side of the seat arrangement. The two frame elements are preferably arranged between the first receiving device and the second receiving device. Preferably, the first receiving device and the second receiving device are each arranged on a fastening element which comprises an arm element, with the two arm elements extending along the height axis (Z) and opening into a base element. The base element is preferably arranged in the centre of and along the height axis (Z) below the two frame elements. The arm elements are designed to converge downwards along the height axis (Z). The arm elements are preferably substantially designed so as to be V-shaped. This embodiment can advantageously have the same further configurations and advantages as the embodiment with only one frame element.

In the embodiments described above, it is advantageous that each fastening element, each receiving device, and possibly the base element are designed integrally or in one piece. A sufficient stability of the seat arrangement is provided by the mounting of the continuous mounting shaft by means of two receiving devices. Another third mounting point is therefore not necessary. This provides a seat arrangement with considerable material savings.

According to a preferred embodiment, the at least one frame element is made of a metal alloy, preferably of an aluminium alloy. The fastening device can also be made at least partially from a metal alloy, preferably from an aluminium alloy. This allows the seat arrangement to be built as light-weight as possible.

According to a further particularly preferred embodiment, a seat cover is arranged on or in the at least one frame element. The at least one frame element preferably includes an inner surface. The seat cover is therefore advantageously arranged in this inner surface. Alternatively, it is preferred if the seat cover is arranged on or above the inner surface. It would also be conceivable that the seat cover encloses the inner surface at least in portions. The seat cover is advantageously provided and determined to withstand the force introduced by the user. The seat cover accordingly advantageously has a corresponding stability. Accordingly, no further supporting elements are advantageously arranged in the inner surface. The seat cover is preferably a knitted fabric. The seat cover is preferably a tubular knitted fabric or a flat knitted fabric.

The underlying object is also solved by an interior device of a means of transport, in particular, a means of passenger transport, which comprises at least one seat arrangement according to one of the preceding embodiments. The interior device can be equipped with all the features already described above in the scope of the seat arrangement, individually, or in combination with each other, and vice-versa. The interior device preferably comprises a plurality of seat arrangements. According to a preferred embodiment, the at least one seat arrangement is arranged on the means of transport so as to be stationary or displaceable by means of a guide device, in particular a rail device. The guide device can be arranged on the floor or a wall element of the means of transport. The seat arrangements can thus advantageously be accommodated in a stowage region of the means of transport, for example a rail vehicle. The space of the means of transport could thus be filled with bulky luggage, for example bicycles. Depending on requirements, a specific number of seat arrangements can be transported from the stowage region into the interior and can be defined accordingly at specific points. This can be done by means of corresponding advantageous latching devices.

Finally, a means of transport, in particular a means of passenger transport, for example a rail vehicle, is provided which has at least one interior device or at least one seat arrangement.

BRIEF DESCRIPTION OF THE DRAWINGS

Further advantages, aims and characteristics of the present invention are explained with reference to the following description of the attached drawings. Similar components may have the same reference signs in the various embodiments.

Shown in the drawings are:

FIGS. 6a-6d a front view, a rear view, a side view, and a bottom view of the embodiment according to FIG. 5;

DETAILED DESCRIPTION

Figures 1A, 1B, 2A, 2B:
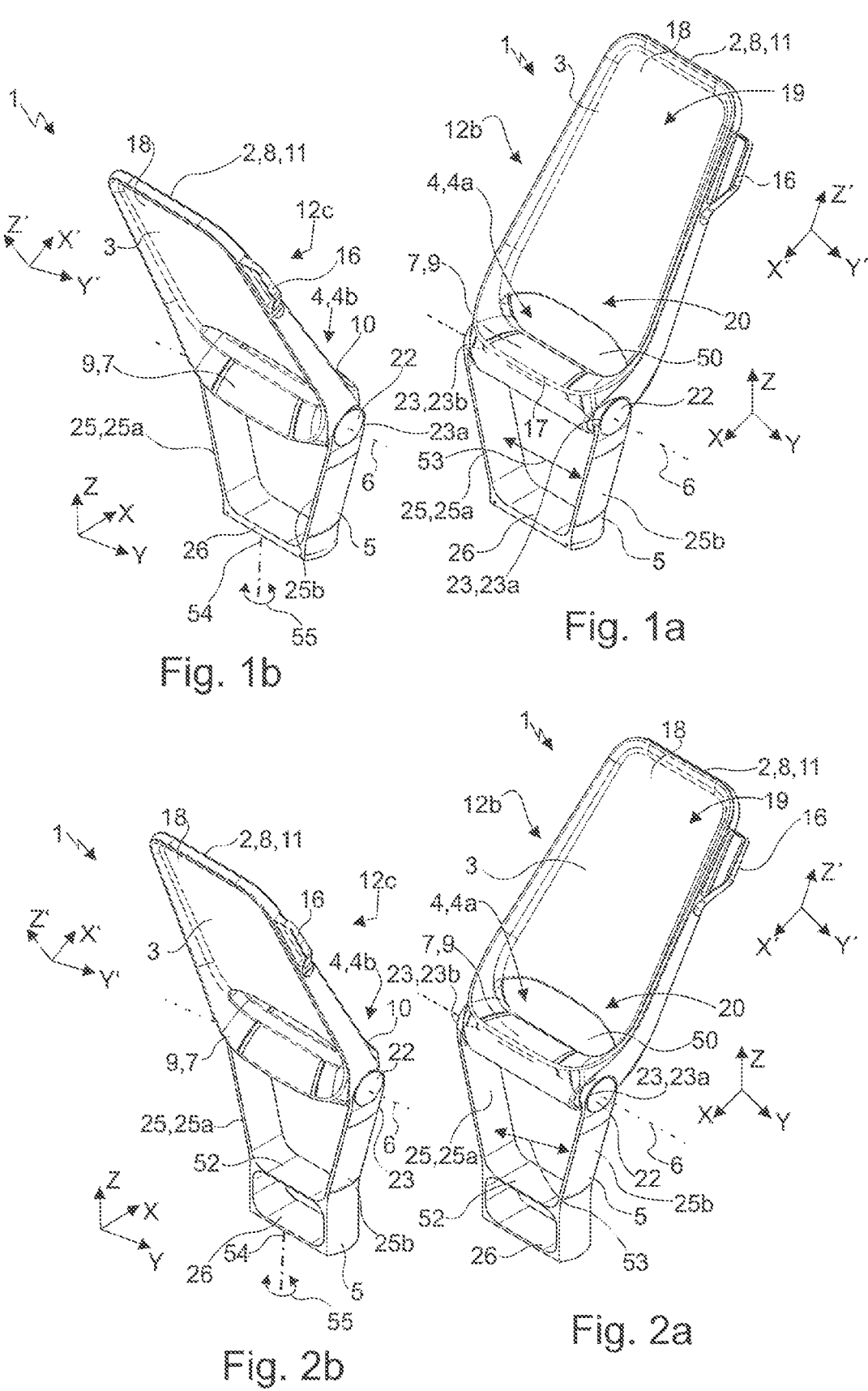
FIG. 1a, 1b a perspective view of a seat arrangement according to an embodiment.
FIG. 2a, 2b a perspective view of a seat arrangement according to an embodiment.

FIGS. 1 to 19 show a seat arrangement 1 for a means of transport 101, in particular for a means of passenger transport, wherein the seat arrangement 1 can be arranged on or in the means of transport 101 by means of a fastening device 5, wherein the seat arrangement 1 is intended and suitable for providing a sitting position at standing height, wherein the seat arrangement 1 comprises one frame elements 2, 2a, 2b, which is arranged on the fastening device 5 by means of at least one mounting shaft 22, wherein the at least one receiving device 23, 23a, 23b is arranged on a fastening element 25 which is configured as an arm element 5, 25*a*, 25*b* extending along a height axis Z. In the following, a coordinate system with a height axis X, a width axis Y, and a depth axis X is used for the seat arrangement. A coordinate system with a height axis X', a width axis Y', and a depth axis X' is used for the at least one frame element. The respective axes can also have two directions. The at least one frame element 2, 2*a*, 2*b* comprises an upper region 3 for supporting the back and at least one seat region 4, 4*a*, 4*b* integrated into the at least one frame element 2, 2*a*, 2*b*. The at least one frame element 2, 2*a*, 2*b* accordingly takes on the function of a backrest and, likewise, the function of a seat part. Accordingly, an extremely simple and inexpensive seat arrangement 1 is provided.

Figure 3:
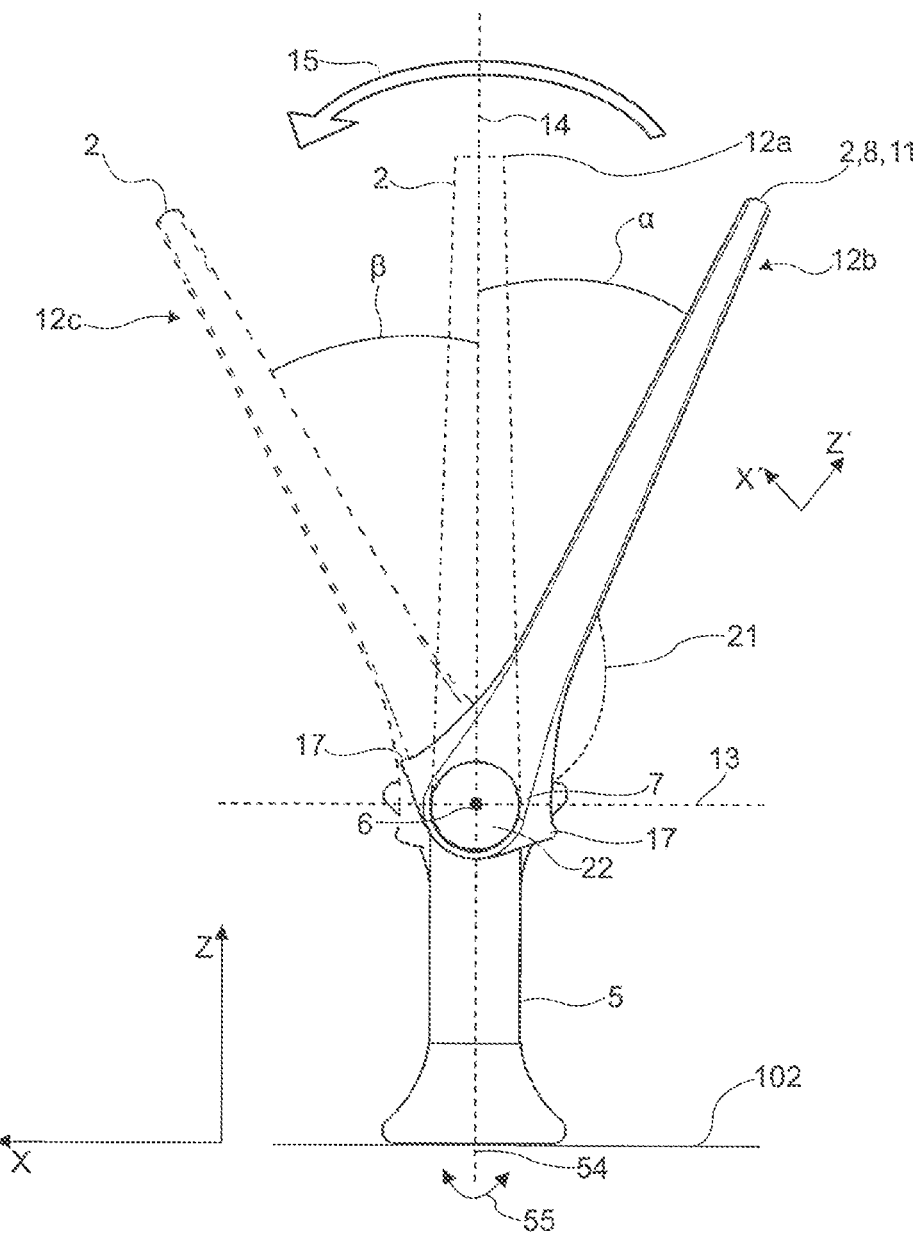
FIG. 3 a side view of a seat arrangement according to an embodiment.

In FIGS. 1*a* to 2*b* and 4, the seat arrangement 1 is shown, which only comprises a frame element 2 arranged on the fastening device 5. FIGS. 5 to 13 show seat arrangements 1 which each comprise two frame elements 2, 2*a*, 2*b*. FIG. 3 shows various pivoting positions which apply both to a seat arrangement 1 having a frame element 2 and to a seat arrangement 1 having two frame elements 2, 2*a*, 2*b*. The seat arrangement 1 is provided and suitable for providing a sitting position at standing height. Such seat arrangements 1 are also referred to as a sit-stand seat. The seat region is preferably arranged at a height between 40 cm and 150 cm, more preferably at a height between 50 cm and 130 cm. The seat height can advantageously be matched to the intended target persons. FIGS. 1*a*, 1*b* show, for example, a seat arrangement 1 which is more suitable for children or the elderly. The seat height is preferably in a range between 40 cm and 60 cm. FIGS. 2*a* and 2*b* show a seat arrangement 1 which is more suitable for adults. The seat height would be in a range between 80 cm and 150 cm, more preferably in a range between 90 cm and 130 cm.

Figure 4:
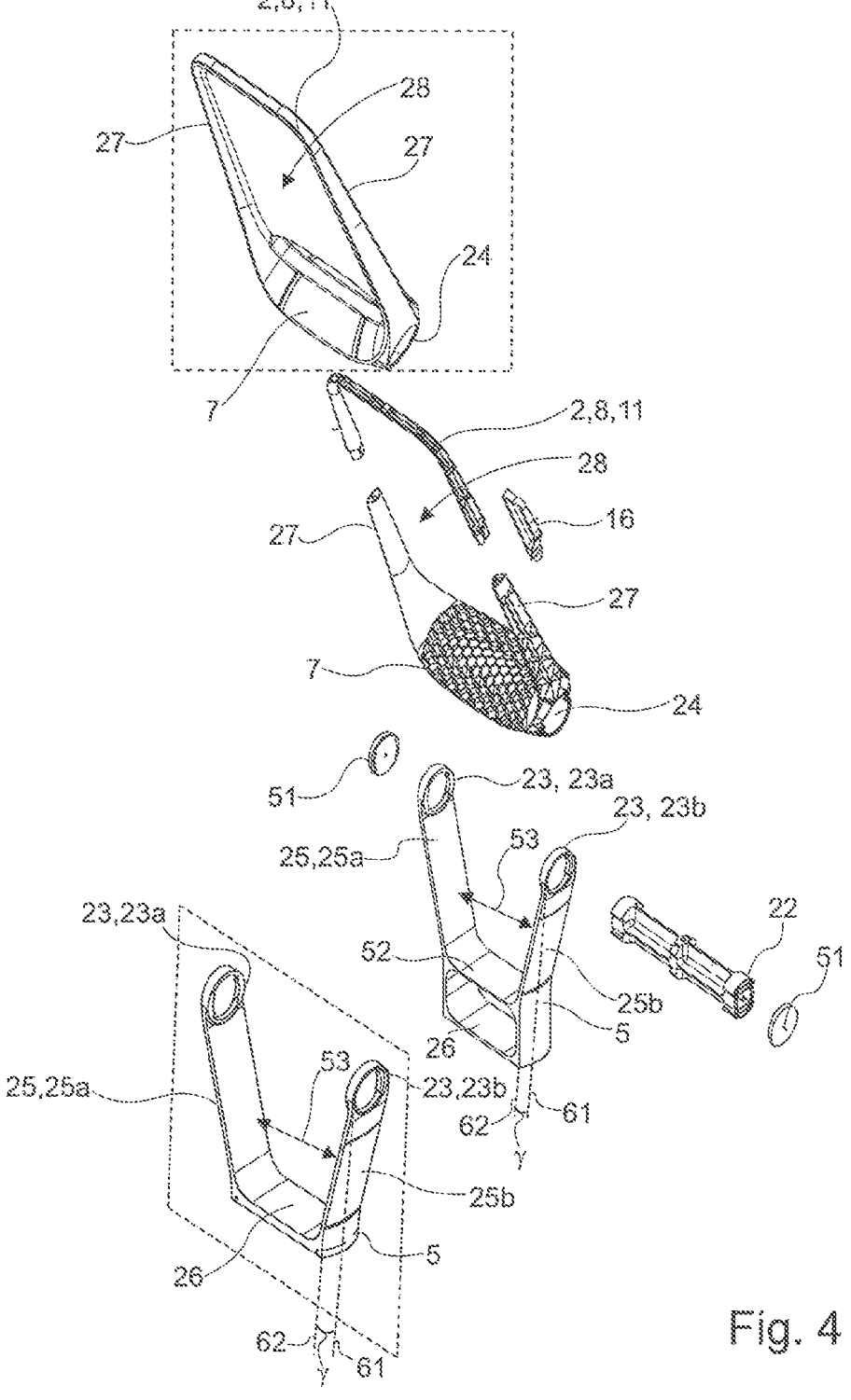
FIG. 4 an exploded view of a seat arrangement according to an embodiment.
Figure 13:
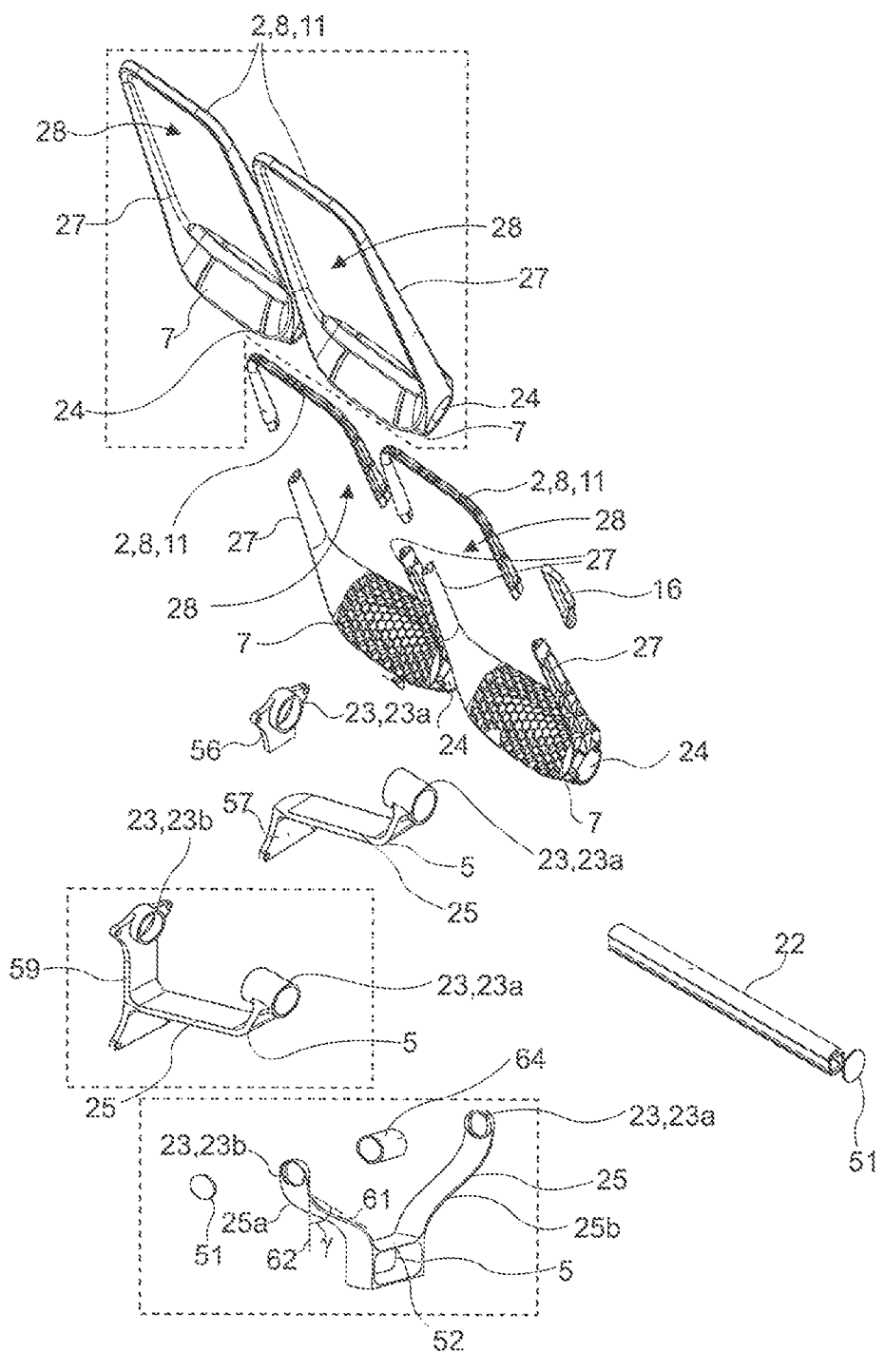
FIG. 13 an exploded view of a seat arrangement according to one embodiment.
Figure 14:
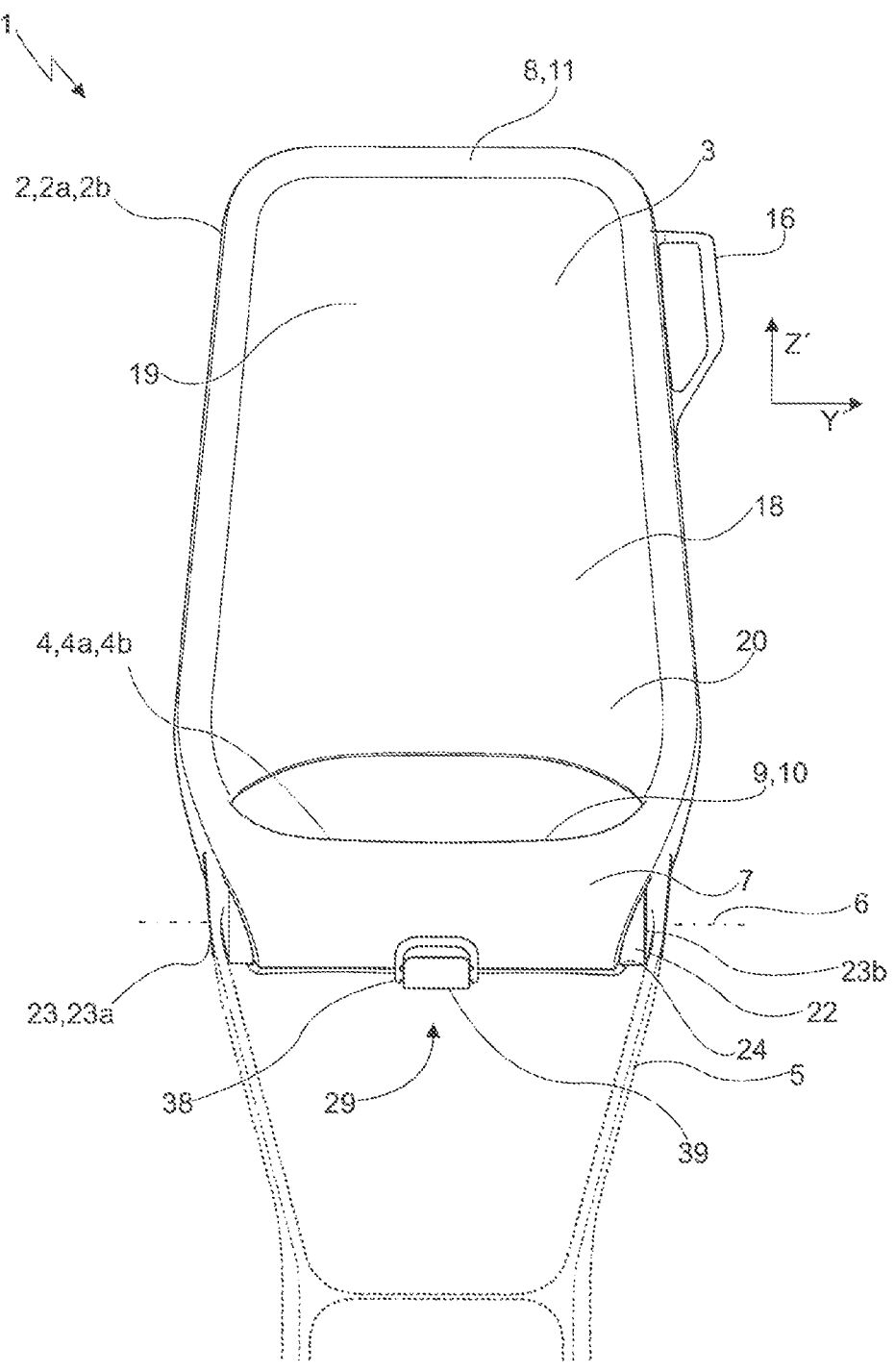
FIG. 14 a front view of a seat arrangement according to one embodiment.
Figure 15:
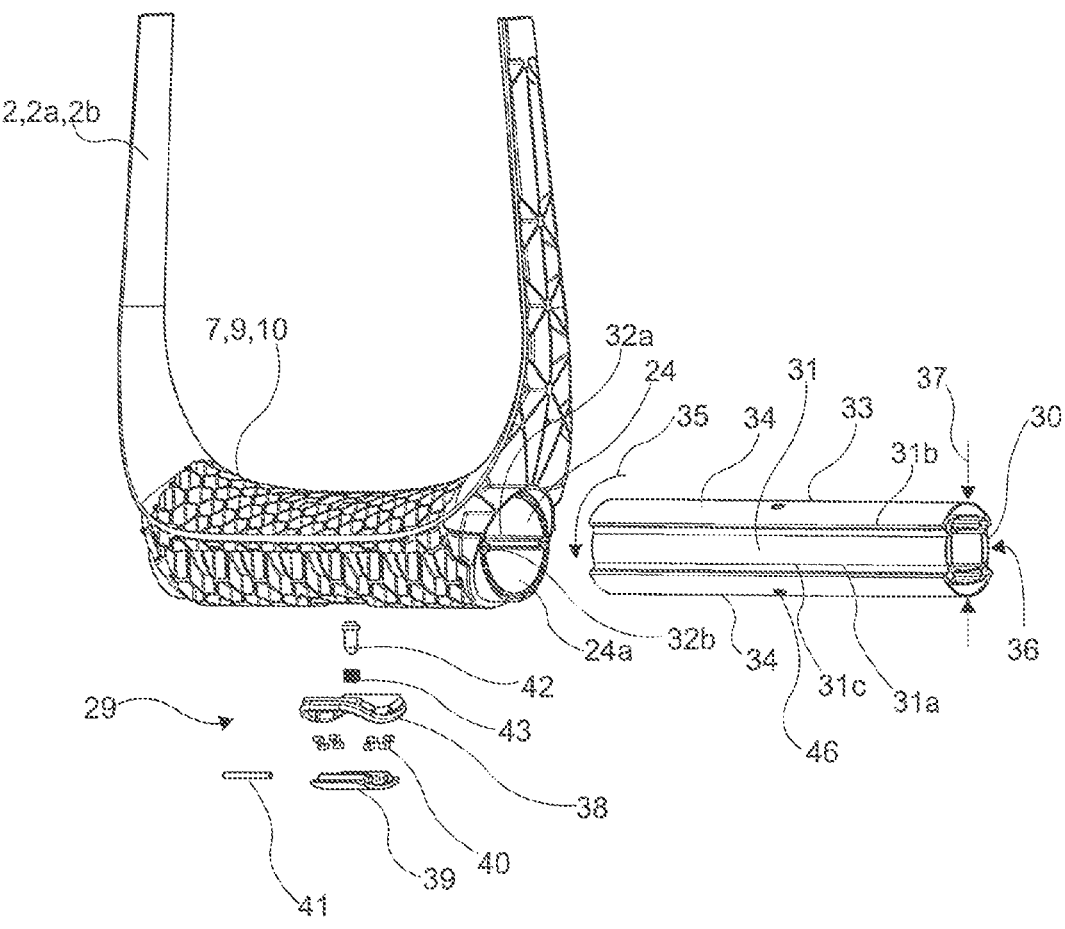
FIG. 15 an exploded view of a frame element according to one embodiment.

The at least one frame element 2, 2*a*, 2*b* can be configured identically in the configuration of the seat arrangement 1 with one frame element 2, 2*a*, 2*b* and in the configuration of the seat arrangement 1 with two frame elements 2, 2*a*, 2*b*. The at least one frame element 2, 2*a*, 2*b* is formed by a lower portion 7 and an upper portion 8. The lower portion 7 comprises at least one first transverse portion 9 extending substantially along a width axis Y', Y and one second transverse portion 10 extending substantially along a width axis Y', Y. The first and the second transverse portion are preferably formed integrally or in one piece. The first 9 and the second transverse portions 10 can have recesses arranged in a honeycomb-shaped lattice structure (see, for example, FIG. 15). As a result, the lower portion can have a very low weight and nevertheless have sufficient stability. The upper portion 8 further comprises a third transverse portion 11 which extends along the width axis Y, Y'. The two width axes Y, Y' are congruent in this case. The first transverse portion 9 and the second transverse portions 10 are spaced apart from the third transverse portion 11 along the height axis T. The first transverse portion 9 and the second transverse portions 10 are connected by means of two strut elements 27. The at least one frame element 2, 2*a*, 2*b* accordingly comprises an inner surface 28 which is bordered by the upper portion 8 and the lower portion 7, or by the third transverse portion, the two strut elements 27, the first transverse portion 9, and the second transverse portion 10. The at least one frame element 2, 2*a*, 2*b* is substantially trapezoidal. The third transverse portion 11 has a smaller width than the first 9 and second transverse portion 10. The first transverse portion 9 and the second transverse portion 10 have a greater extent along a depth axis X' than the third transverse portion 11. The first transverse portion 9 or the second transverse portion 10 form the seat region 4, 4*a*, 4*b*, at least in portions. The lower portion 7 and the upper portion 8 of the at least one frame element 2, 2*a*, 2*b* form the at least one frame element 2, 2*a*, 2*b* integrally, in one piece, or in multiple pieces. FIGS. 4 and 13 each show a one-piece design of the frame element(s) 2, 2*a*, 2*b* in the region surrounded by dashed lines. These figures also show a further embodiment of the frame element(s) 2, 2*a*, 2*b*, in which it is/are formed in two parts. For this purpose, the at least one frame element consists of a lower portion 7 and an upper portion 8, in which case both portions 7 and 8 are U-shaped. For this purpose, the two strut elements 27 are advantageously interrupted and connected by means of a detachable connection, preferably a plug connection. Such a releasable connection is, for example, a plug connection. Two portions of the strut element are preferably inserted one into the other. Security devices, such as pins, screws, bolts, etc., are also advantageously provided, by means of which the plug connection can be secured against unintentional loosening.

The at least one frame element 2, 2*a*, 2*b* can be pivoted relative to the fastening device 5 about a pivot axis 6 extending along a width axis Y. The at least one frame element 2, 2*a*, 2*b* can be pivoted as a whole with respect to the pivot axis 6. Thus, both the upper region 3 for supporting the back and the integrated seat region 4, 4*a*, 4*b* are simultaneously pivoted or rotated about the pivot axis 6. In contrast, only the backrest can be pivoted about a pivot axis in conventional seat arrangements. Preferably, the at least one frame element 2, 2*a*, 2*b* is pivotable into at least two pivoting positions 12*a*, 12*b*, 12*c*. More preferably, the at least one frame element 2, 2*a*, 2*b* is pivotable into three pivoting positions 12*a*, 12*b*, 12*c*. These pivoting positions 12*a*, 12*b* 12*c* are shown in FIG. 3, for example. In this figure, the double arrow 15 is also shown, which illustrates the pivoting directions again. The at least one frame element 2, 2*a*, 2*b* is pivotable into a first pivoting position 12*a*, in which case at least one frame element 2, 2*a*, 2*b* extends substantially perpendicular to an imaginary plane 13 which extends parallel to the floor 102 of the means of transport 101 in the first pivoting position 12*a*). In other words, the at least one frame element 2, 2*a*, 2*b* extends upright or substantially parallel to the height axis Z of the seat arrangement 1 in the first pivoting position. In this pivoting position, the seat arrangement 1 has only a minimal space requirement along the depth axis, which substantially corresponds to the extent of the first 9 and second transverse portions 10. The at least one frame element 2, 2*a*, 2*b* is pivotable into a second pivoting position 12*b*, which is inclined relative to the first pivoting position 12*a* by an angle of inclination α. Furthermore, the at least one frame element 2, 2*a*, 2*b* is pivotable into a third pivoting position 12*c*, which is inclined relative to the first pivoting position 12*a* by an angle of inclination (3. A second imaginary plane 14 can be defined, which runs perpendicular to the first imaginary plane 13. The at least one frame element 2, 2*a*, 2*b* is substantially arranged in the second imaginary plane 14 in the first pivoting position. In the second 12*b* and the third pivoting position 12*c*, the at least one frame element 2, 2*a*, 2*b* each include the angle of inclination α or β with the second imaginary plane 14. The at least one frame element 2, 2*a*, 2*b* is in this case inclined in directions opposite along a depth axis X in the second pivoting position 12*b* and the third pivoting position 12*c*. The angles of inclination α and β thus have different signs (±), but the same amount. The angles of inclination α, β are preferably in a range between 10° and 80°, more preferably in a range between 20° and 70°, in which case the at least one frame element 2, 2a, 2b and the second imaginary plane 14 include the angles of inclination α, β.

Furthermore, a latching apparatus 29 is provided, by means of which at least one frame element 2, 2a, 2b can be locked in at least one pivoting position 12a, 12b, 12c. Preferably, at least one frame element 2, 2a, 2b can be locked in the first 12a, the second 12b, and the third pivoting position 12c. It would also be conceivable that the at least one frame element 2, 2a, 2b can be locked only in the second 12b and the third pivoting position 12c. It is also conceivable that the at least one frame element can assume at least the second and third pivoting position without the frame element 2, 2a, 2b being latched. Due to the inclination of the at least one frame element and an advantageous stop, the frame element remains in this corresponding pivoting position 12b, 12c even without any further locking. When the seat arrangement is occupied by the user, the at least one frame element remains in the pivoting position 12b, 12c. In the second pivoting position 12b of the at least one frame element 2, 2a, 2b, a first seat region 4, 4a is formed at least by the first transverse portion 9. This is shown, for example, in FIGS. 1a and 2a. In the third pivoting position 12c of the at least one frame element 2, 2a, 2b, a second seat region 4, 4b is formed at least by the second transverse portion 10. This is shown, for example, in FIGS. 1b and 2b. In the second pivoting position 12b of the at least one frame element 2, 2a, 2b, the first seat region 4, 4a extends substantially parallel to the first imaginary plane 13. In the third pivoting position 12c of the at least one frame element 2, 2a, 2b, the second seat region 4, 4b extends substantially parallel to the first imaginary plane 13. This substantially parallel extension of the first or second seat region 4, 4a, 4b allows the occupant to sit comfortably.

Figures 11A, 11B, 11C, 11D:
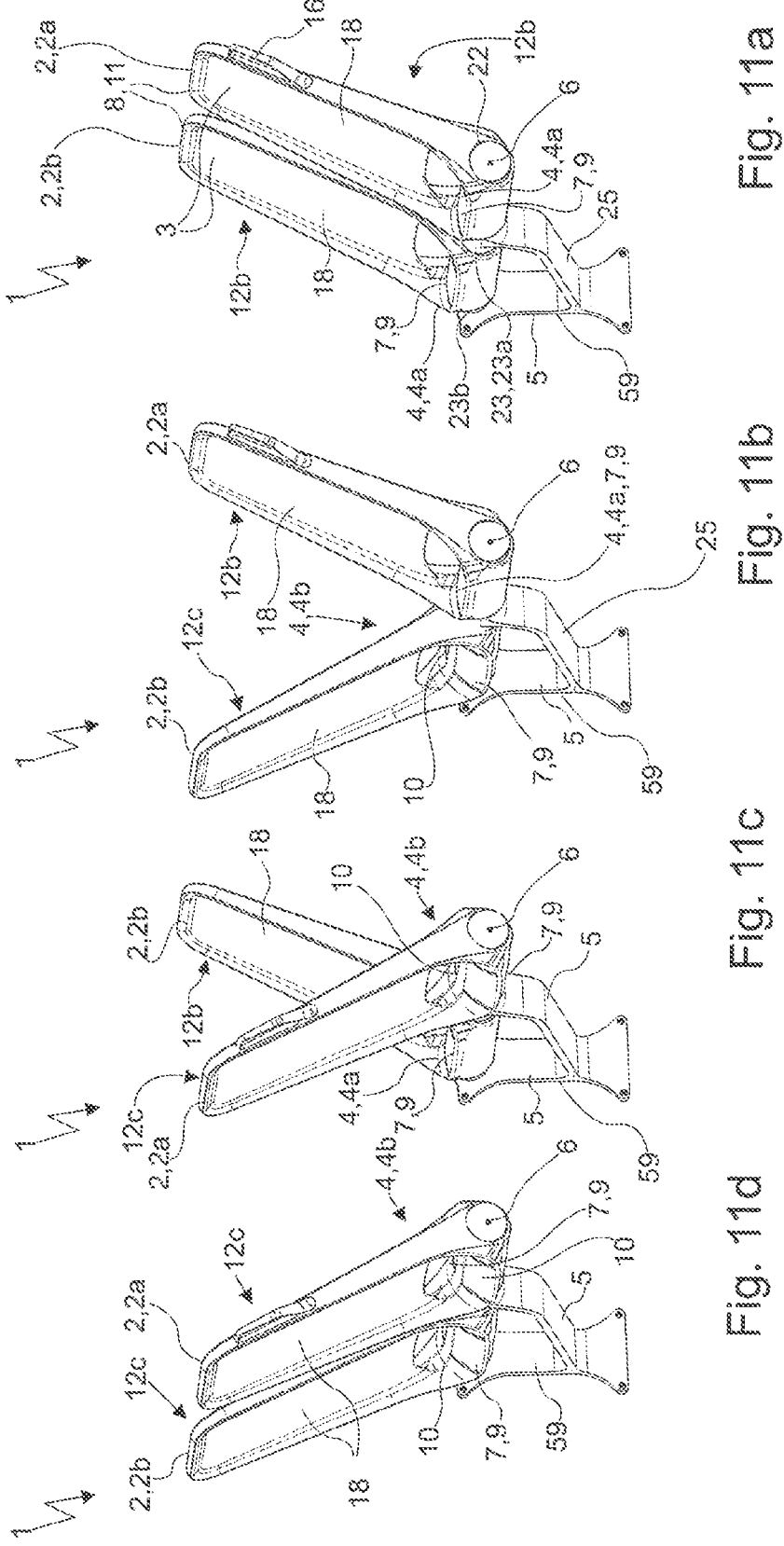
FIG. 11a-11d views of various possible pivoting positions of a seat arrangement according to one embodiment.
Figures 12A, 12B, 12C, 12D:
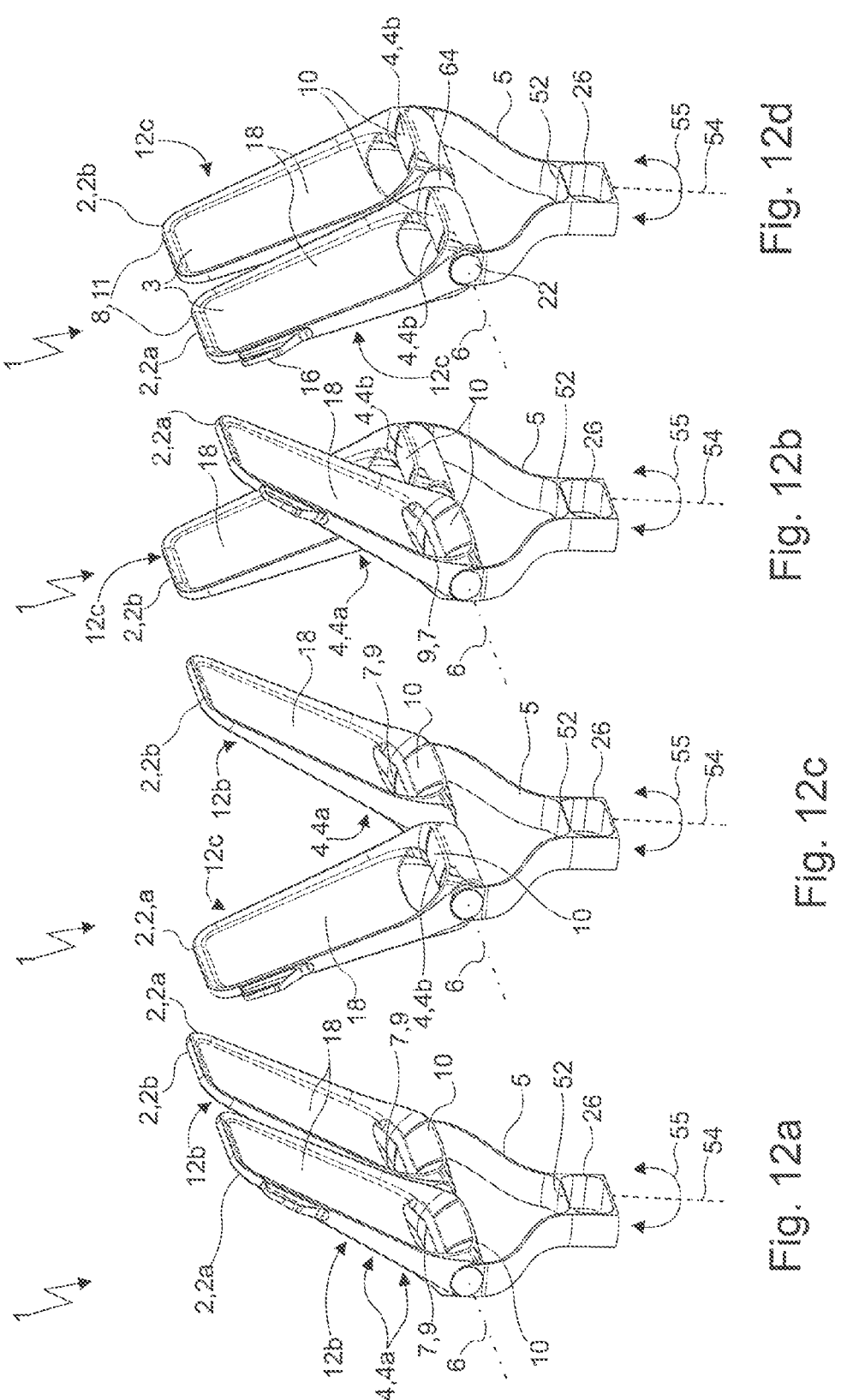
FIGS. 12a-12d views of various possible pivoting positions of a seat arrangement according to one embodiment.

FIGS. 11a to 11d and 12a to 12d show seat arrangements 1 with two frame elements 2, 2a, 2b in different pivoting positions 12a, 12b, 12c. FIGS. 11a to 11d differ from FIGS. 12a to 12d in the design of the fastening device 5. Seat arrangements 1, which comprise a fastening device 5 according to any of the further possible configurations, can, however, also assume the pivoting positions shown. In FIGS. 11a and 12a, the two frame elements 2, 2a, 2b are in the second pivoting position 12b. Each of the frame elements 2, 2a, 2b thus provides the first seat region 4, 4a in the form of the first transverse portion 9. In FIGS. 11d and 12d, the two frame elements 2, 2a, 2b are in the third pivoting position 12c. Each of the frame elements 2, 2a, 2b thus provides the second seat region 4, 4b in the form of the second transverse portion 10. In FIGS. 11b and 12b, the first frame element 2a is in the second pivoting position 12b, as a result of which the first seat region 4, 4a is provided in the form of the first transverse portion 9. The second frame element 2b is located in the third pivoting position 12c, as a result of which the second seat region 4, 4b is provided in the form of the second transverse portion 10. In FIGS. 11c and 12c, the first frame element 2a is in the third pivoting position 12c, as a result of which the second seat region 4, 4b is provided in the form of the second transverse portion 10. The second frame element 2b is located in the second pivoting position 12b, as a result of which the first seat region 4, 4a is provided in the form of the first transverse portion 9. With such a design, seating groups consisting of such seat arrangements 1 can be flexibly and individually coordinated.

The at least one frame element 2, 2a, 2b is arranged on the fastening device 5 by means of a mounting shaft 22. The mounting shaft 22 is received in at least one receiving device 23, 23a, 23b of the fastening element 5 in such a way that the mounting shaft 22 is non-rotatably connected to the fastening device 5. Furthermore, the mounting shaft 22 extends through a through channel 24 of the at least one frame element 2, 2a, 2b, as a result of which the at least one frame element 2, 2a, 2b is arranged to be pivotable relative to the fastening element 5 or the mounting shaft 22. The mounting shaft 22 is shown in detail in FIGS. 4, 13 and 15 to 17c. The mounting shaft 22 is configured substantially as a hollow cylinder having a substantially circular cross section, for example as a profile tube.

The mounting shaft 22 has at least one, in the present case two, stop elements 30, 31. These stop elements 30, 31 are designed as a recess in the lateral surface 33 of the mounting shaft. The recess preferably extends over the entire extent along the width axis Y of the mounting shaft 22. At least one, in the present case two further stop element(s) 32a, 32b, is/are arranged in the through channel 24. These two stop elements 32a, 32b are configured as a projection on the inner surface 24a of the through channel 24. The projection preferably extends over the entire extent along the width axis Y of the through channel 24. The through channel 24 can extend along the entire width extension of the at least one frame element 2, 2a, 2b or at least along a substantial portion of the width extension. A substantial portion is at least half, preferably at least three quarters of the total width, of the frame element 2, 2a, 2b. The stop elements 30, 31 of the mounting shaft 22 and the further stop elements 32a, 32b of the through channel 24 are each arranged diametrically opposite one another. However, it would also be conceivable for only one stop element 30, 31, 32a, 32b to be arranged on the mounting shaft 22 and the through channel 24. The lateral surface 33 of the mounting shaft 20 has two outer regions 34, against which an inner surface 24a of the through channel 24 abuts in such a way that rotation of the at least one frame element 2, 2a, 2b relative to the mounting shaft 22 is made possible. A stop element 30, 31 is provided in the form of a recess between the two outer regions 34 along a circumferential direction 35 of the mounting shaft 22. A radius 36 to the inner surfaces 30a, 31a of the stop elements 30, 31 is thus smaller than a radius 37 to the outer regions 34. As can be seen in FIGS. 15 to 17c, the inner surfaces 30a, 31a are designed in such a way that they curve outwards. During a pivoting movement of the at least one frame element 2, 2a, 2b, the at least one further stop element 32a, 32b of the through channel 24 is displaced along a circumferential direction 35 of the mounting shaft 22 relative to the mounting shaft 22. The further stop elements 32a, 32b that are designed as projections protrude into the stop elements 30, 31 of the mounting shaft that are designed as recesses. The stop elements 30, 31 each have two stop surfaces 30b, 31b, 30c, 31c, which represent the transition to the adjacent outer regions 34. In the second and third pivoting positions 12b, 12c, the further stop elements 32a, 32b configured as projections rest on the diametrically opposite stop surfaces 30b, 31b, 30c, 31c of the stop elements 30, 31 which are designed as recesses.

Figure 16:
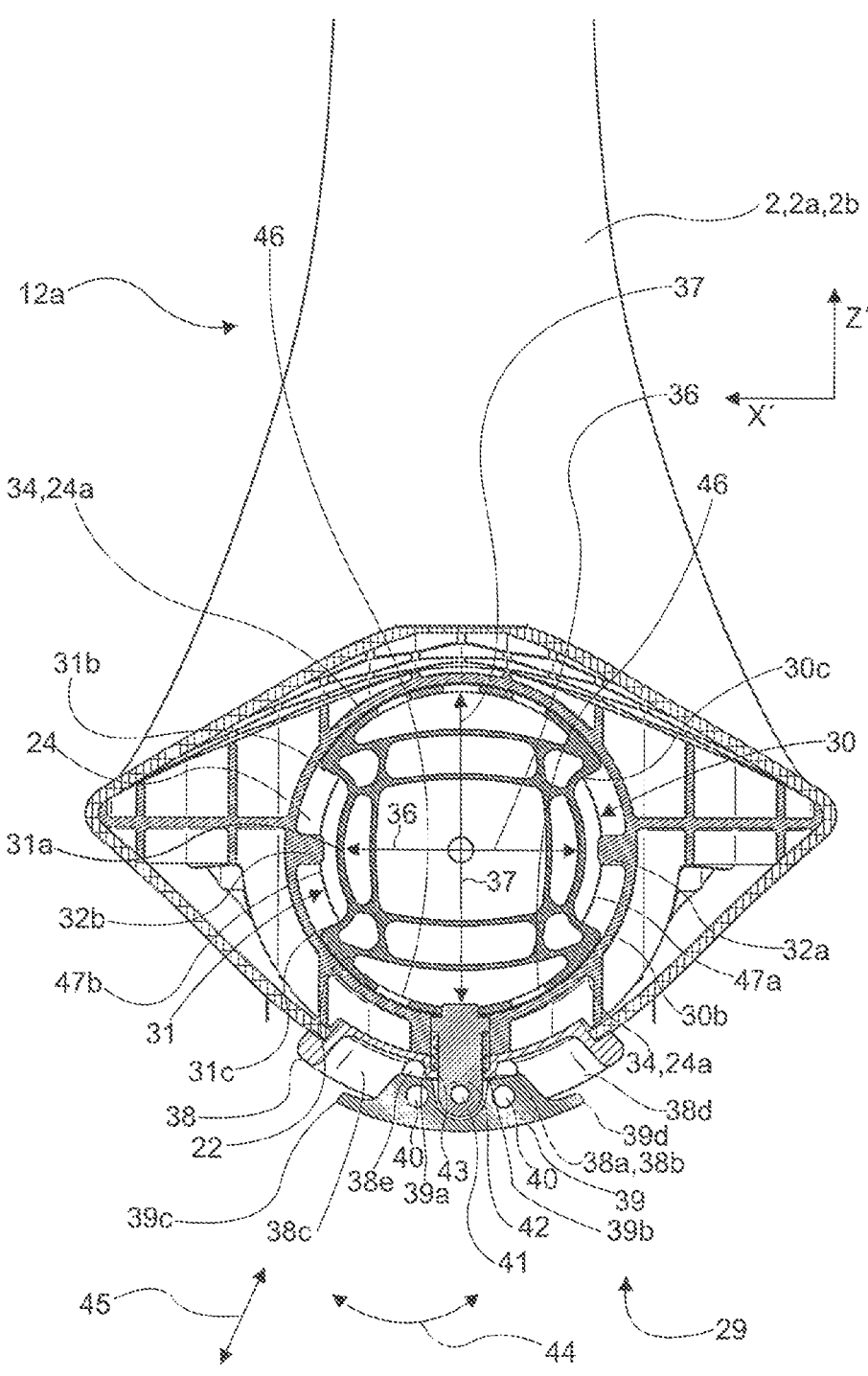
FIG. 16 a sectional view of a frame element according to one embodiment.
Figures 17A, 17B, 17C:
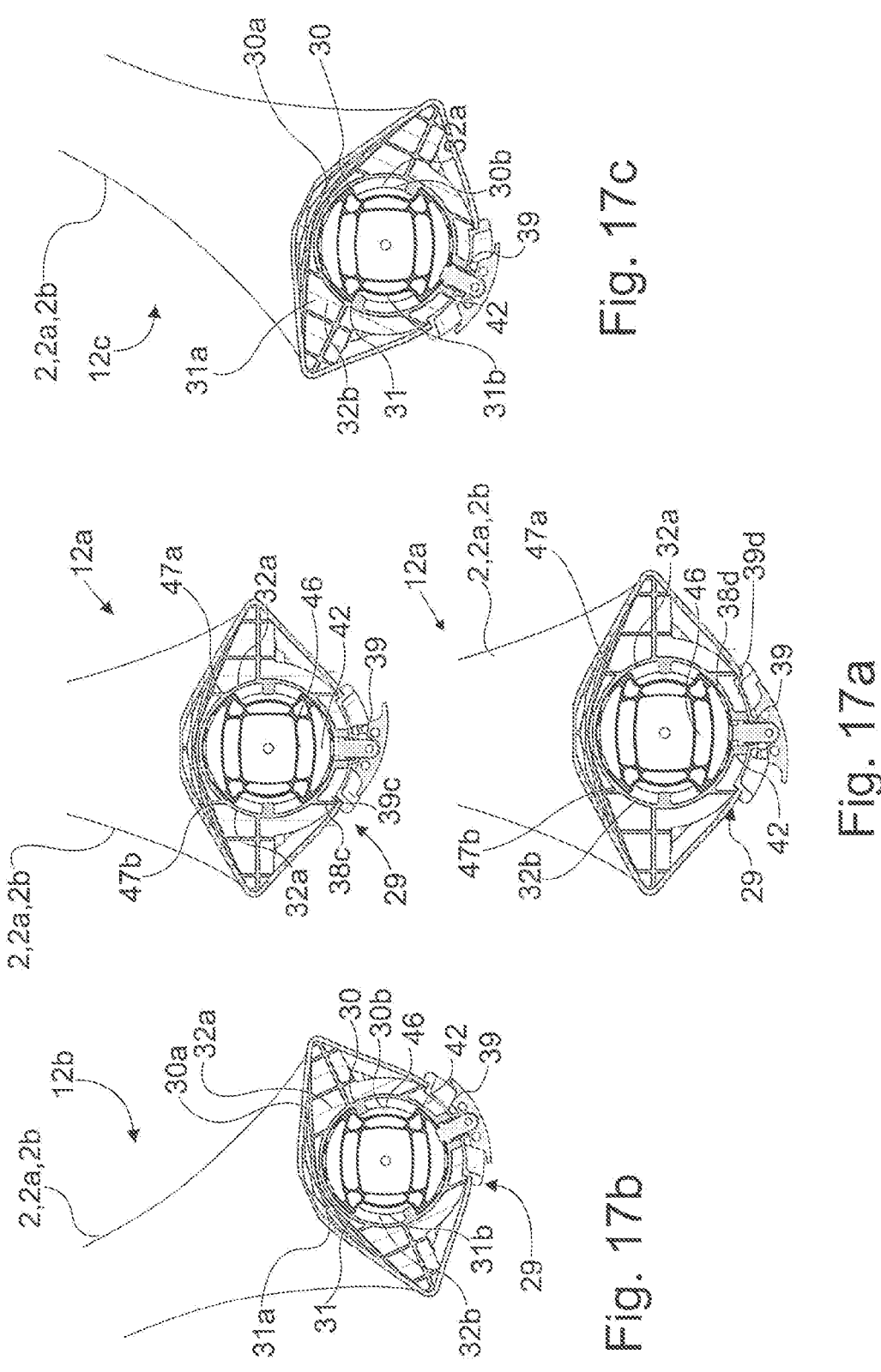
FIGS. 17a-17c sectional views of a frame element in different pivoting states according to one embodiment.
Figure 18B:
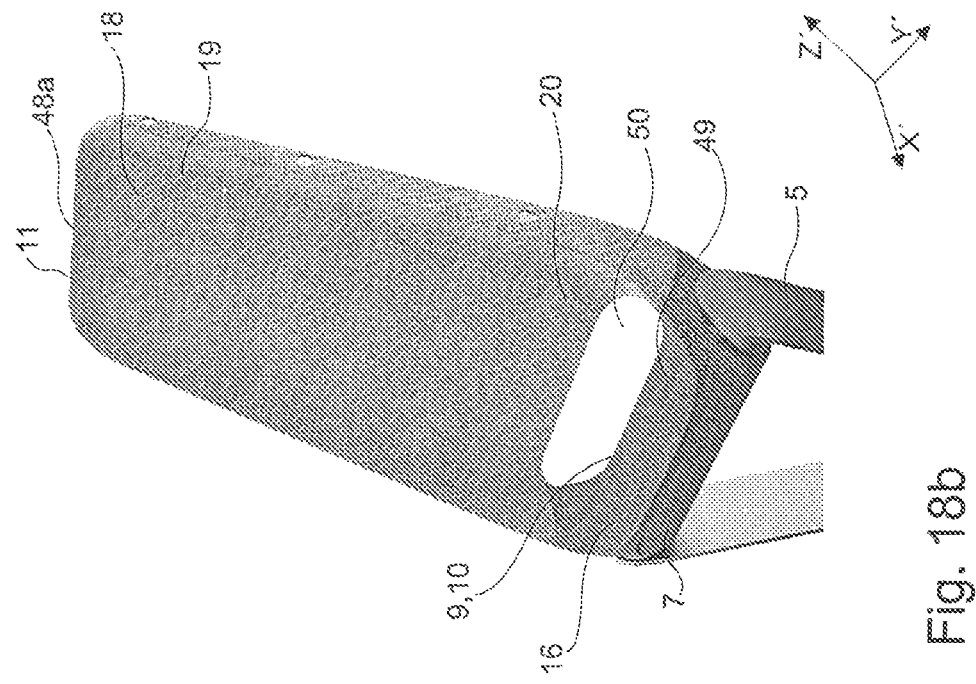
FIG. 18a, 18b views of a seat arrangement according to an embodiment with a seat cover.
Figure 18A:
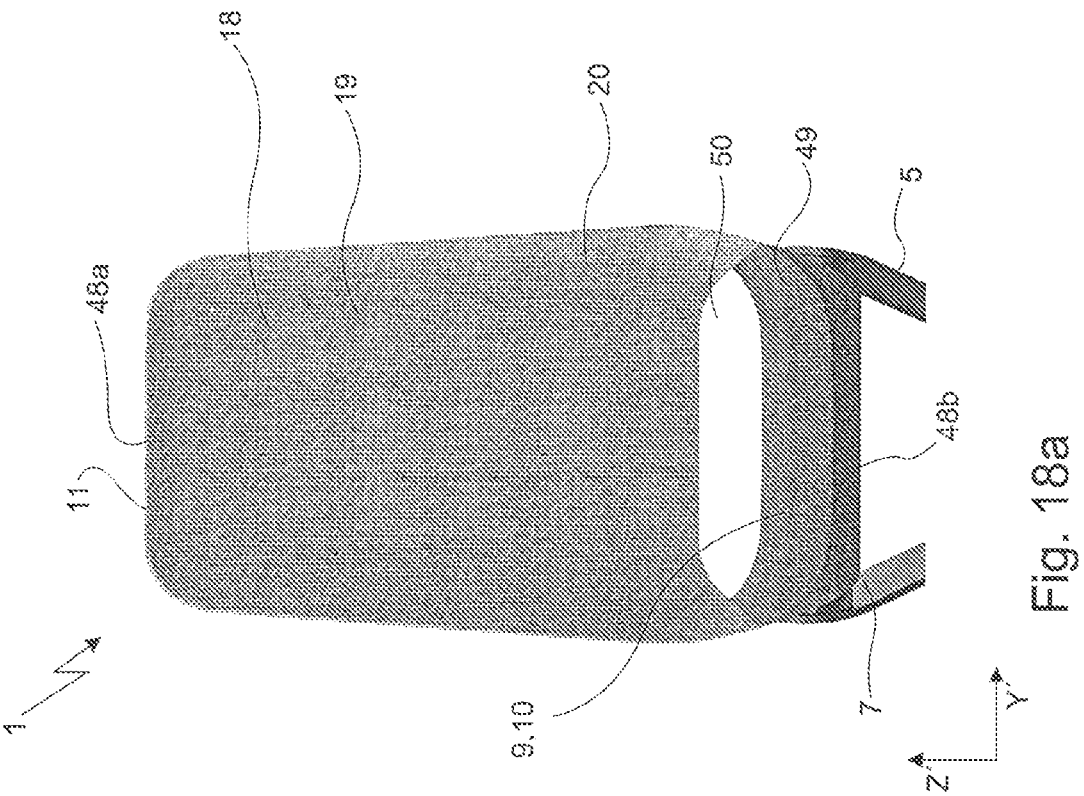

Furthermore, a latching apparatus 29 is provided, by means of which the pivoting positions 12a, 12b, 12c, which are possible by the pivoting, can be locked. The latching apparatus 29 is arranged on the at least one frame element 2, 2a, 2b or on the lower portion 7. This is shown by way of example in FIG. 14. The locking device 29 is shown in detail in FIGS. 16 to 17c. FIG. 17c shows the second pivoting position 12b. FIG. 17b shows the third pivoting position 12c. The first pivoting position is shown in FIGS. 16 and 17a. For reasons of clarity, only a few particularly relevant reference signs are shown in FIGS. 17a to 17c. The latching apparatus 29 comprises a first locking element 42, which can be brought into engagement with at least one further locking element 46 of the mounting shaft 22. A further locking element 46 of the mounting shaft 22 is assigned to each pivoting position 12a, 12b, 12c of the at least one frame element 2, 2a, 2b. Furthermore, the latching apparatus 29 comprises an operating element 39, by means of which the first locking element 42 can be displaced. In this case, by displacing the first locking element 42, the engagement with the at least one further locking element 46 of the mounting shaft 22 can be released. Furthermore, the latching apparatus 29 comprises a holding element 38, by means of which the latching apparatus 29 is arranged on the at least one frame element 2, 2a, 2b, preferably on a lower side of the at least one frame element 2, 2a, 2b, preferably on the lower portion 7 of the at least one frame element 2, 2a, 2b along the height direction T. The holding element 38 is fastened to the frame element 2, 2a, 2b by means of a clip connection. However, other connections are also conceivable. The operating element 39 is arranged on the holding element 38, in which case mounting elements 40 are provided between the holding element 38 and the operating element 39. The operating element 39 is pivotably attached to the first locking element 42 by means of a shaft 41 and is thus rockable. The mounting elements 40 are guided in a guide 38e of the holding element 38. The first locking element 42 is configured like a pin or in the form of a bolt. Furthermore, a reset device 43 in the form of a compression spring element is provided. This is actuated or compressed during the displacement movement to release the engagement. After actuation of the operating element 39, the first locking element 42 can be displaced by the reset device 43, whereby an engagement with the at least one further locking element 46 of the mounting shaft 22 is made possible. The reset device or compression spring 43 is arranged between the locking element 42 and the holding element 38. For this purpose, the first locking element 42 has a radially outwardly projecting collar on which the compression spring rests. The locking element 42 is thus subjected to a spring force which presses the locking element 42 radially inwards. In a non-use state, the locking element 42 engages in a further locking element 46 of the mounting shaft 22 designed as a recess or bore. A plurality of recesses 46 are preferably provided. These recesses 46 are arranged in the outer region 34 of the lateral surface 33 along the circumferential direction of the mounting shaft 22. Three recesses 46 are advantageously provided. The arrangement of the recesses 46 is provided in such a way that, in the predetermined pivoting positions 12a, 12b, 12c, the locking element 42 can engage in a recess 46 which is respectively assigned to the pivoting position. The first locking element 42 protrudes through an opening 38a of the holding element 38, which is surrounded by an outwardly extending raised collar 38b. The reset device rests on the inside against the raised collar 38b. Two support portions 39a, 39b lie on each of these collars 38b. The first support portion 39a is opposite to the second support portion 39b along a circumferential direction 44. The operating element 39 comprises two operating portions 39c, 39d. The first operating portion 39c is opposite the second operating portion 39d along a circumferential direction 44. In comparison to the support portions 39a, 39b, the operating portions 39c, 39d lie farther out along the circumferential direction 44 and along a radial direction 45. When the latching apparatus 29 is operated, one of the operating portions 39c, 39d is pressed inwards in the radial direction 45. The respective operating portion 39c, 39d can thus be moved into a respective recess region 38c, 38d of the holding element 38. Due to the spacing of the operating portions 39c, 39d from the support portions 39a, 39b and the support of the support portions 39a, 39b on the collar 38b, a lever force acts on the shaft 41, which is arranged centrally on the operating element 39 and connects it to the first locking element 42. The first locking element 42 is accordingly displaced outward in the radial direction 45. This displacement takes place against the spring force of the compression spring 43, whereby the compression spring 43 is compressed. The displacement of the locking element 42 from the respective recess 46 is released and the at least one frame element 2, 2a, 2b can be pivoted.

FIG. 16 shows a non-use position in which the at least one frame element 2, 2a, 2b is located in the first pivoting position 12a. Each further stop element 32a, 32b of the through channel 24 is located substantially in the centre along an imaginary circular arc 47a, 47b of the first 30 or second stop element 31. The imaginary circular arc 47a, 47b extends in each case between the first stop surface 30b, 31b and the second stop surface 30c, 31c. The first locking element 42 engages into the central recess 46 on the outer region 34 and thus locks this first pivoting position 12a. In this first pivoting position 12a, the at least one frame element 2, 2a, 2b is generally located substantially perpendicular to the first imaginary plane 13 and is, therefore, in a stowed position. FIG. 17a shows the at least one frame element 2, 2a, 2b in the first pivoting position 12a, in two views. In the upper view, the first operating portion 39c of the operating element 39 has been actuated and thus shifted radially inward into the first recess region 38c of the holding element 38. In the bottom view, the second operating portion 39d has been actuated and thus shifted radially inward into the second recess region 38d of the holding element 38. The engagement of the first locking element 42 from the recess 46 is thus released, and the at least one frame element 2, 2a, 2b can be pivoted into the desired pivoting position. In FIG. 17b, the at least one frame element 2, 2a, 2b is located in the second pivoting position 12b. The first further stop element 32a of the at least one frame element 2, 2a, 2b bears against the first stop surface 30a of the first stop element 30. The second further stop element 32b of the at least one frame element 2, 2a, 2b bears against the second stop surface 31b of the second stop element 31. The forces applied by the user on the at least one frame element 2, 2a, 2b are guided by these stops 30a, 31b from the at least one frame element 2, 2a, 2b into the mounting shaft 22 and thus into the fastening element 5. The at least one frame element 2, 2a, 2b is locked in this pivoting position 12b, since the first locking element 42 of the latching apparatus 29 engages in the corresponding recess 46, which is assigned to this pivoting position 12b, on the mounting shaft 22. In FIG. 17c, the at least one frame element 2, 2a, 2b is located in the third pivoting position 12c. The first further stop element 32a of the at least one frame element 2, 2a, 2b bears against the second stop surface 30b of the first stop element 30. The second further stop element 32b of the at least one frame element 2, 2a, 2b bears against the first stop surface 31a of the second stop element 31. The forces applied by the user on the at least one frame element 2, 2a, 2b are guided by these stops 30b, 31a from the at least one frame element 2, 2a, 2b into the mounting shaft 22 and thus into the fastening element 5. The at least one frame element 2, 2a, 2b is locked in this pivoting position 12c, since the locking element 42 of the first latching apparatus 29 engages in the corresponding recess 46, which is assigned to this pivoting position 12c, on the mounting shaft 22.

Accordingly, the angles of inclination α, β are predetermined by the length of the imaginary arcs 47a, 47b. Furthermore, it is conceivable that the operating element 39 be arranged at a different position of the at least one frame element 2, 2a, 2b. The operating element 39 could, for example, also be arranged on the upper portion 8 of the at least one frame element 2, 2a, 2b. Furthermore, a gripping element 16 could be provided, which is arranged on the upper portion 8. The operating element 39 could be integrated into the gripping element 16. With such a configuration, the mode of operation described at the outset for actuating the first locking element 42 can be retained. The (lever) force described above, which acts on the shaft 41, could be transmitted from the operating element 39 to the shaft 41 by means of a transmission device. Such a (mechanical) transmission device could, for example, be a Bowden cable, an actuating rod, or a transmission device using gear wheels. These transmission devices can preferably be arranged in or on the at least one frame element 2, 2a, 2b. However, it would also be conceivable for the transmission device to transmit electrical signals which control an actuator. The actuator then actuates the locking element 42.

A seat cover 18 is arranged on or in the at least one frame element 2, 2a, 2b. The seat cover 18 is in or above the inner surface 28, which is enclosed by the frame element 2, 2a, 2b, or the upper portion 8 and the lower portion 7. If the at least one frame element 2, 2a, 2b is made integrally or in one piece, the seat cover 18 can be of tubular design. Accordingly, a portion of the tubular seat cover 18 could advantageously be arranged on each side above the inner surface 28. This is shown, for example, in FIGS. 18a and 18b. The tubular seat cover 18 comprises along the height axis Z' a first upper opening side 48a, which is preferably closed by means of a seam and abuts the third transverse portion 11. Furthermore, the tubular seat cover 18 comprises a second opening side 48b, which is lower along the height axis Z', which is preferably closed by means of an openable closure and lies on top or on the lower portion 7. In the case of a two-piece configuration of the at least one frame element 2, 2a, 2b, a flat seat cover 18 can be used. This is indicated in FIGS. 1a to 2b and 5 to 12d. The edge of the seat cover 18 is connected from the bottom upwards to the at least one frame element 2, 2a, 2b. The seat cover 18 is connected to the two strut elements 27 and the third transverse portion 11. For this purpose, for example, a piping rail can be arranged on the inside of the two strut elements 27 and the third transverse portion 11. The piping rail is provided on an inner side of the at least one frame element 2, 2a, 2b and thus faces the inner surface 28. The seat cover 18 has a piping lug, which is arranged or clamped in the piping rail.

The seat cover 18 is advantageously a knitted fabric. Such a knitted fabric is advantageously made with a knitting machine. This advantageous use of a knitted fabric allows a high degree of variability in the design of the regions with different elasticities. Such knitted fabrics, which have both flexible and rigid or fixed portions, can be produced very simply and inexpensively in comparison to woven fabrics. The knitted fabric is advantageously produced using a 3D knitting method. Such an advantageous technique allows both flexible and rigid regions to be incorporated within a knitted part. It is advantageous here that the seat cover 18 has at least two regions 19, 20 which have different elasticities. A first region 19 has a lower elasticity than the second region 20. The second region 20 is elastically deformable by the action of a force. The first region 19 is arranged along the height axis Z' above the second region 20. Such a first region 19 can thus be provided and be suitable for supporting a shoulder region of the user. The second region 20, which has a higher elasticity, can then be arranged in or above a middle and/or lower portion of the inner surface 28 along the height axis Z'. Such a second region 20 can be provided and be suitable for supporting the user's lower back and gluteal region. Of course, it would also be conceivable to provide further regions with different elasticities in the seat cover. Furthermore, the seat cover 18 is connected to the at least one frame element 2, 2a, 2b at the edge from the bottom upwards. By the action of force, the second region 20 forms a three-dimensional deformation 21 or bulge. This is shown schematically in FIG. 3. This force is exerted by the leaning action of the user. Accordingly, when pivoting from the second to the third pivoting position or vice versa, the force is applied in the opposite direction, as a result of which the three-dimensional deformation will also develop in the opposite direction. The seat cover 18 can have a third region 49, which is arranged along the height axis Z' below the second region. This third region 49 can be connected to the at least one frame element 2, 2a, 2b by means of a preferably detachable connection. The third region 49 can be arranged on the first 9 and the second transverse portion 10 and serve as seat upholstery. This is depicted, for example, in FIGS. 18a and 18b. The seat cover 18 can also have an intermediate space or cut-out 50. The third region 49 and the second region 19 are therefore only connected via web-like portions which are arranged on the strut elements 27 of the at least one frame element 2, 2a, 2b. Alternatively, the second region 19 merges into the third region 49 without interruption. This is shown by way of example in FIG. 5.

The seat region 4, 4a, 4b can be further enlarged if at least one additional element 17 is provided which is arranged on the lower portion 7 of the at least one frame element 2, 2a, 2b. The depth extension of the seat region 4, 4a, 4b is increased by the additional element 17. The additional element 17 can be arranged on the upper surfaces of the first and/or second transverse portion, or it can be arranged adjacent to the upper surfaces of the first and/or second transverse portion. Such an additional element is indicated in FIG. 3 and can be attached to the frame element 2, 2a, 2b by a frictional and/or a positive-locking connection. Possible connections are clip connections, screw connections, plug connections, etc. The additional element 17 can also be provided to fix the seat cover 18. An effective seat surface can thus be defined which comes into contact with the user. The effective seat surface advantageously comprises the first or second seat region 4a, 4b and is preferably oriented substantially horizontally or parallel to the first imaginary plane 13. This effective seat surface is provided by the first or second seat region, depending on the pivoting position 12b, 12c. The effective seat surface can be provided at least in portions by the upper surface of the first transverse portion 9 or the upper surface of the second transverse portion 10. However, it would also be conceivable that further elements, further layers, covers, upholstery, etc., be arranged on the upper surfaces of the transverse portions 9, 10, which then form the effective seat surface, at least in portions. The additional element 17 can also increase the effective seat surface. The effective seat surface can preferably be formed, at least in portions, by the additional element 17. However, it would also be conceivable that further layers, covers, upholstery, etc., be arranged on the additional element 17, which then form the effective seat surface at least in portions. An effective seat surface advantageously comprises the first or second seat region 4a, 4b of the at least one frame element 2, 2a, 2b and a portion of the second region 20 of the seat cover 18. The effective seat surface can also include the transition between the third 49 and the second regions 19 of the seat cover 18.

On the at least one frame element, at least one gripping element 16 is furthermore arranged on at least one strut element 27 or the upper portion 8. The gripping element is typically arranged on an outer side of the seat arrangement 1, which lies on a walkway of the means of transport. If two walkways are provided, a gripping element 16 can of course also be provided on each outer side of the seat arrangement 1.

FIGS. 1a to 2b and 4 show a seat arrangement 1 with only one frame element 2. The fastening device 5 comprises two fastening elements 25 in the form of arm elements 25a, 25b, which extend along the height axis Z and open into a base element 26. Starting from the base element 26, the arm elements 25a, 25b also extend along the width axis Y, so that they run obliquely upwards. A distance 53 between the first arm element 25a and the second arm element 25b decreases downwards along the height axis Z. At an upper end, the arm elements 25, 25a, 25b each have the receiving devices 23, 23a, 23b for the mounting shaft 22. The receiving devices 23, 23a, 23b can be formed integrally, in one piece, or in multiple pieces with the arm element. In a transition region which leads to the receiving devices 23, 23a, 23b, the arm elements 25, 25a, 25b are advantageously oriented substantially parallel to the height axis Z. In a middle or lower region of the arm elements 25a, 25b, these are inclined with respect to a reference axis 61 which runs perpendicular to the first imaginary plane 13. An angle of inclination $\gamma$ can thus be defined between this reference axis 61 and a central axis 62 of the arm elements 25, 25a, 25b. This angle of inclination $\gamma$ is dependent on the ratio of the widthwise extension of the base element 26 and the widthwise extension of the mounting shaft 22. This is shown by way of example in FIGS. 8a and 9a. The angle of inclination $\gamma$ lies in a range between 5° and 30°, preferably in a range between 10° and 20°. The arm elements 25, 25a, 25b can be designed as a flat profile. In this flat profile, a preferably circular recess can form the receiving devices 23, 23a, 23b. Furthermore, the receiving devices 23, 23a, 23b can be designed to be substantially cylindrical with a preferably circular transverse portion. The base element 26 has a smaller extent along the width axis Y than the mounting shaft 22, or as the distance between the receiving devices 23, 23a, 23b. Furthermore, a cover element 51 is provided on the sides of the receiving device 23, 23a, 23b. The arm elements can run substantially rectilinear or V-shaped, as shown in FIGS. 1a to 2b and 4. However, an approximately S-shaped or an arched extent of the arm elements 25, 25a, 25b is also conceivable. The base element 26 is either fastened directly to the floor 102 of the means of transport 101, or is displaceably arranged on the floor 102 of the means of transport 101 via a guide device. Such a configuration has the advantage that the base element is arranged centrally under the at least one frame element 2, 2a, 2b. A symmetrical introduction of force into the base element 26 can thus take place. This allows the guide system 102 to be designed more simply. If, for example, a rail system is used as the guide system 102, it is sufficient that only one rail be used. In FIGS. 1a and 1b, a fastening element 5 is provided which has a lower height. The base element 26 is merely configured as a cross strut and/or as a flat profile extending along the width axis Y. Such seat arrangements 1 could be used by seniors or children, for example. FIGS. 2a and 2b show a seat arrangement 1 with a seat height for adults. The base element 26 is designed as a substantially rectangular element which comprises two cross struts which extend along the width axis Y. The upper cross strut along the height axis Z is intended as a foot support region 52. It would also be conceivable that a rotating apparatus be arranged on or in the base element 26 or be integrated. The fastening device 5 or the seat arrangement 1 could then be rotated about a rotation axis 54 which runs parallel to the height axis Z. This is indicated in FIGS. 1b, 2b and 3 by the double arrow 55.

The embodiments according to FIGS. 5 to 13 show a seat arrangement 1 with two frame elements 2, 2a, 2b, which are arranged on the fastening device 5. The two frame elements 2, 2a, 2b are arranged side by side along the width axis Y. As already described, the two frame elements 2, 2a, 2b can be pivoted independently of one another about a common pivot axis 6 extending along a width axis Y relative to the fastening device 5 by the angles of inclination $\alpha$, $\beta$ into the first, second, and third pivoting positions 12a, 12b, 12c. The fastening device 5 can be designed in different ways. In all embodiments, a mounting shaft 22 is provided which extends along the seat arrangement and extends through the respective through channels 24 of the two frame elements 2, 2a, 2b. As already described, such a through channel 24 can extend substantially over the entire width of a frame element 2, 2a, 2b. An only partial extension would also be conceivable. A latching apparatus 29 is also provided on each of the two frame elements 2, 2, 2a, 2b. The mounting shaft 22 is received in two receiving devices 23, 23a, 23b of the fastening device 5. FIG. 13 shows an exploded view of the seat arrangement analogous to FIG. 4. However, only 3 possible configurations of the fastening device 5 are shown in FIG. 13. Of course, the other fastening devices 5 shown could also be inserted in FIG. 13. In these embodiments, at least one cover element 51 can also be provided for closing the mounting shaft 22. The mounting shaft 22 is received in at least two receiving devices 23, 23a, 23b of the fastening device 5. Each of the receiving devices 23, 23a, 23b is arranged on a fastening element 25. According to the embodiments according to FIGS. 5 to 11d, a first receiving device 23a is arranged between the first frame element 2a and the second frame element 2b. Another second receiving device 23b is arranged on the side of one of the two frame elements 2a, 2b, or on one of the two outer sides of the seat arrangement 1. The two receiving devices 23, 23a, 23b are substantially cylindrical in shape with a substantially circular transverse portion.

Figure 5:
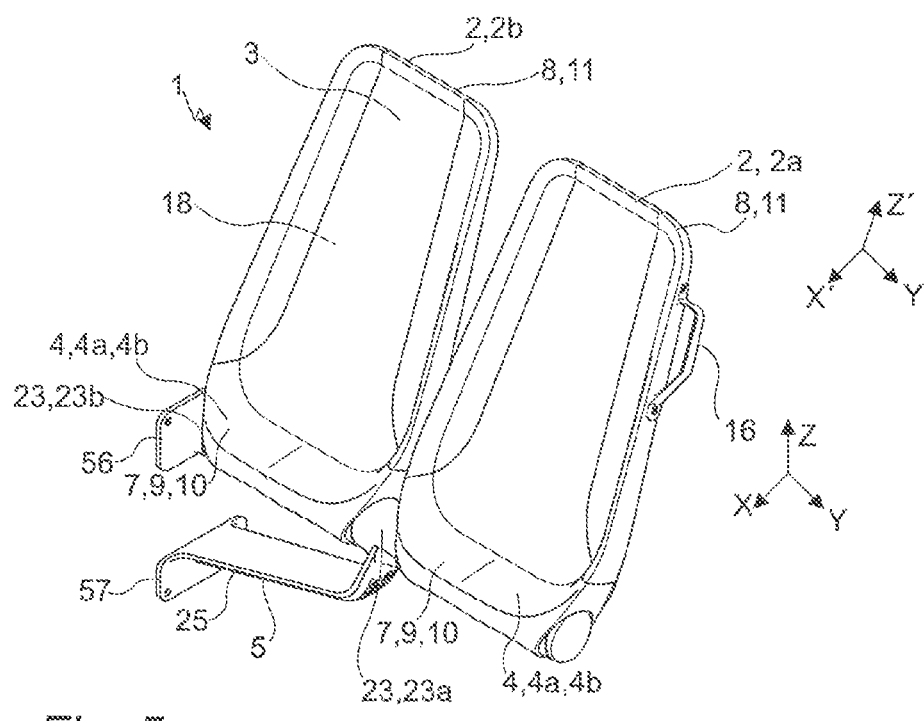
FIG. 5 a perspective view of a seat arrangement according to an embodiment.
Figure 6A:
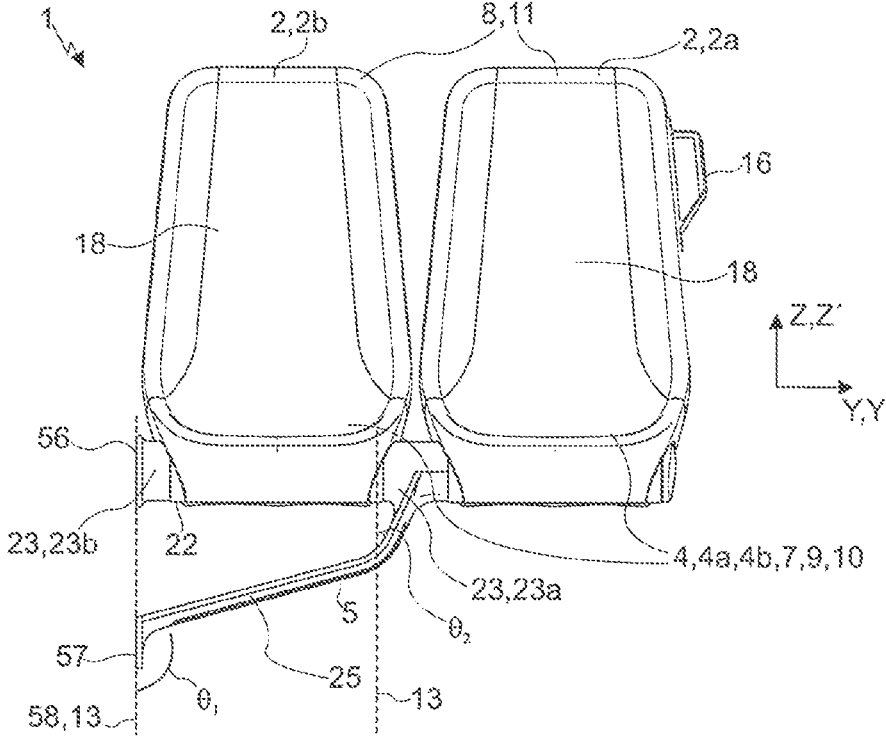

According to the embodiment according to FIGS. 5 to 6d, a second receiving device 23b is arranged on a fastening element 25 in the form of a plate-like first element 56, which can be fastened to a wall element of the means of transport 101. The first plate-like element 56 is accordingly arranged in a fastening plane 58 (see FIG. 6c) which extends substantially parallel to the second imaginary plane 14. The wall element of the means of transport 101 advantageously includes the fastening plane 58. The first receiving device 23a is arranged on a fastening element 25 in the form of an arm element 25. This arm element 25 is designed as a cantilever arm or a cantilever. The arm element 25 accordingly extends from the first receiving device 23a to the fastening plane 58 and ends in a plate-like element 57, which is likewise arranged in the fastening plane 58 and can be arranged on the wall element of the means of transport. Starting from the second plate-like element 57d, a lower cantilevered portion of the arm element 25 extends obliquely upwards along the height axis Z. The lower cantilevered portion forms an angle $\theta_1$ with the first imaginary plane 13, which lies in a range between 10° and 45°. An upper portion of the arm element 25 adjoining the lower portion encloses an angle $\theta_2$ with the first imaginary plane 13, which lies in a range between 45° and 90°. FIG. 5 shows a perspective view of this embodiment. FIG. 6a shows a front view, and FIG. 6b shows a rear view of this embodiment. FIG. 6c shows a side view, and FIG. 6d shows a bottom view of this embodiment. The embodiment according to FIGS. 11a to 11d is analogous to the embodiment according to FIGS. 5 to 6d. The only difference is that only one plate-like element 59 is provided. This third plate-like element 59 also extends in the fastening plane 58. Furthermore, the second receiving device 23b is arranged on this third plate-like element 59. Likewise, the arm element 25 opens into the third plate-like element 59. The third plate-like element 59 can therefore also be understood as a merging of the first 56 and second plate-like element 57. The plate-like elements 57, 58, 59 also have means by which they can be fastened to the means of transport. These are, for example, bores that are intended for a corresponding screw connection. It is of course also conceivable that further similar fastening techniques can be considered.

Figure 7:
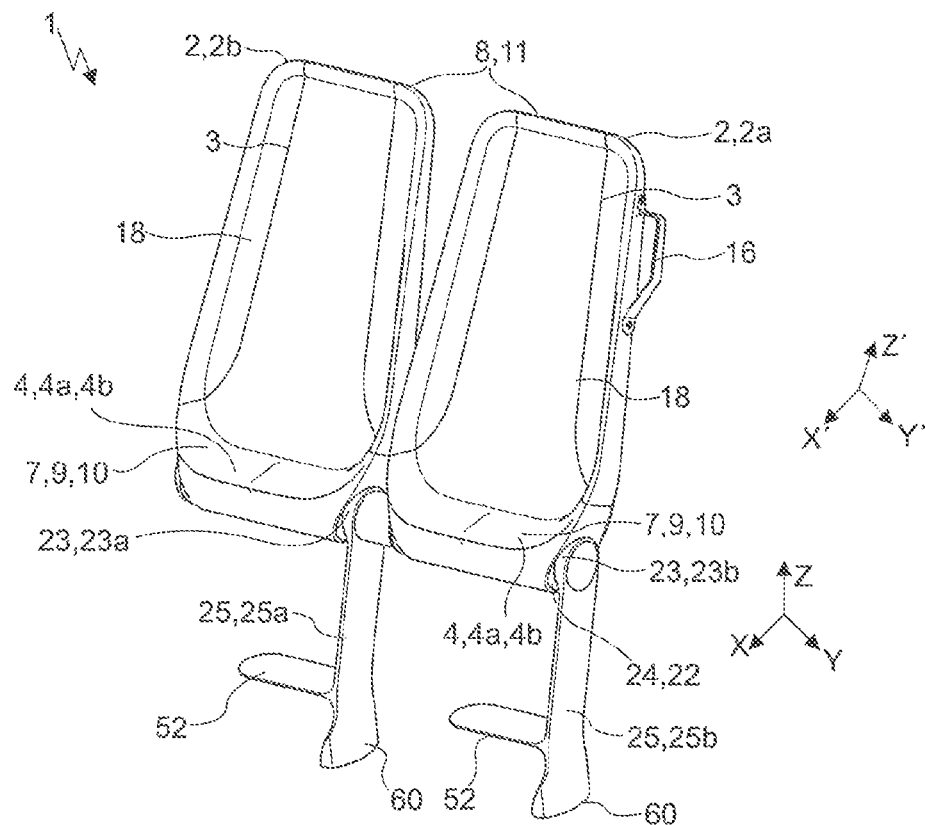
FIG. 7 a perspective view of a seat arrangement according to an embodiment.
Figure 8A:
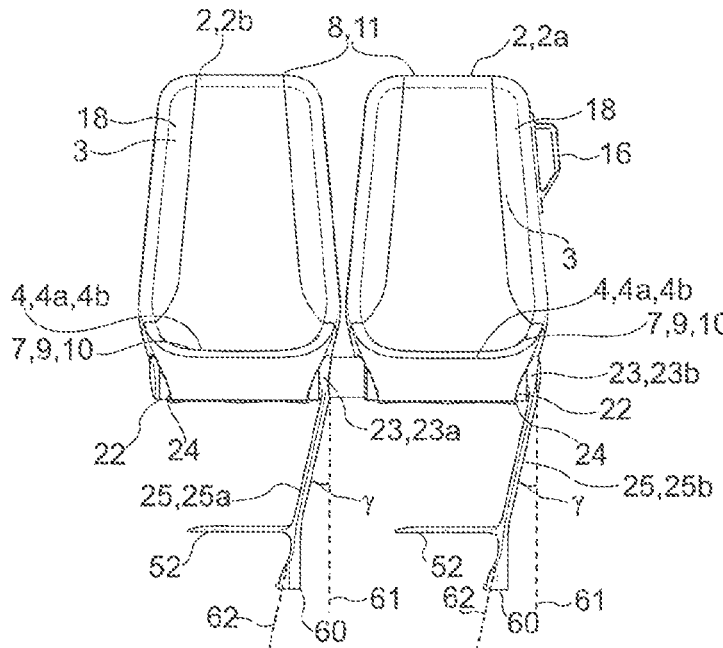
FIGS. 8a-8d a front view, a rear view, a side view, and a bottom view of the embodiment according to FIG. 7.
Figures 8B, 8C, 8D:
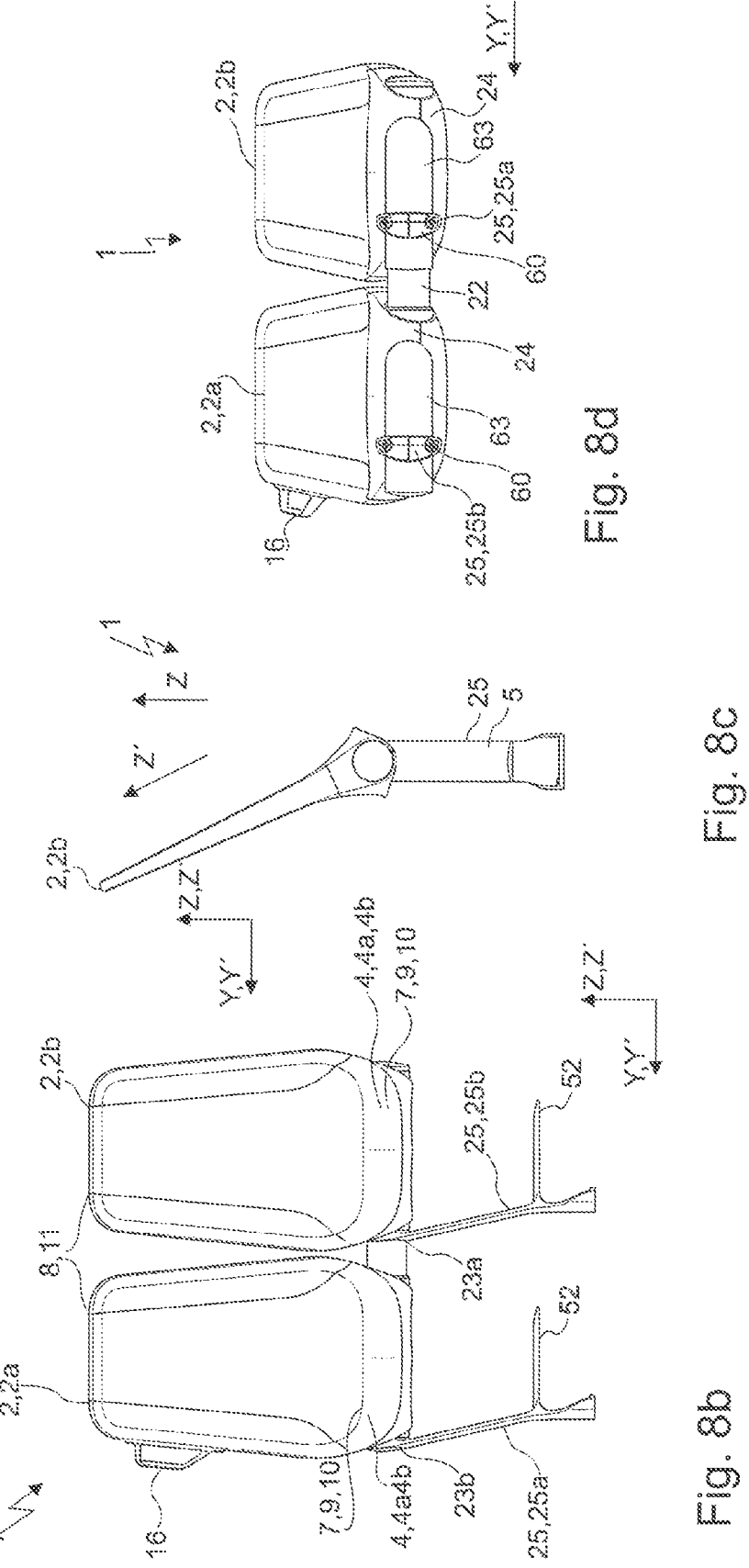
Figure 9:
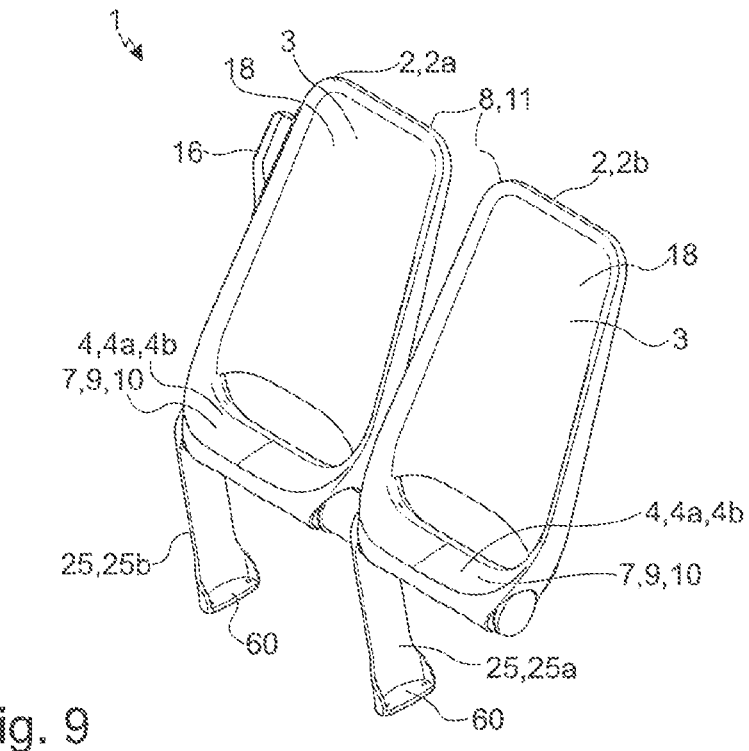
FIG. 9 a perspective view of a seat arrangement according to one embodiment.
Figure 10A:
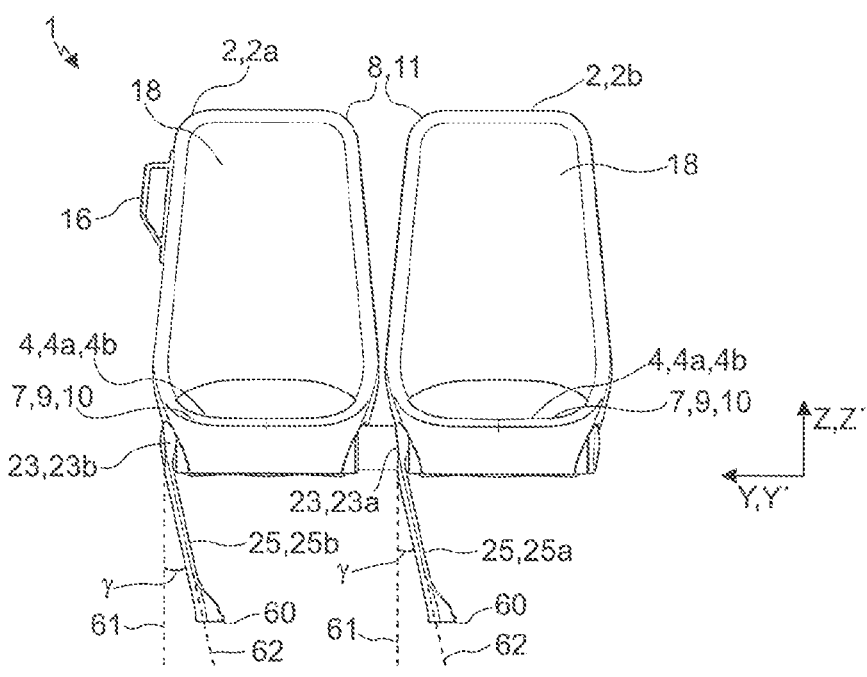
FIGS. 10a-10d a front view, a rear view, a side view, and a bottom view of the embodiment according to FIG. 9.
Figures 10B, 10C, 10D:
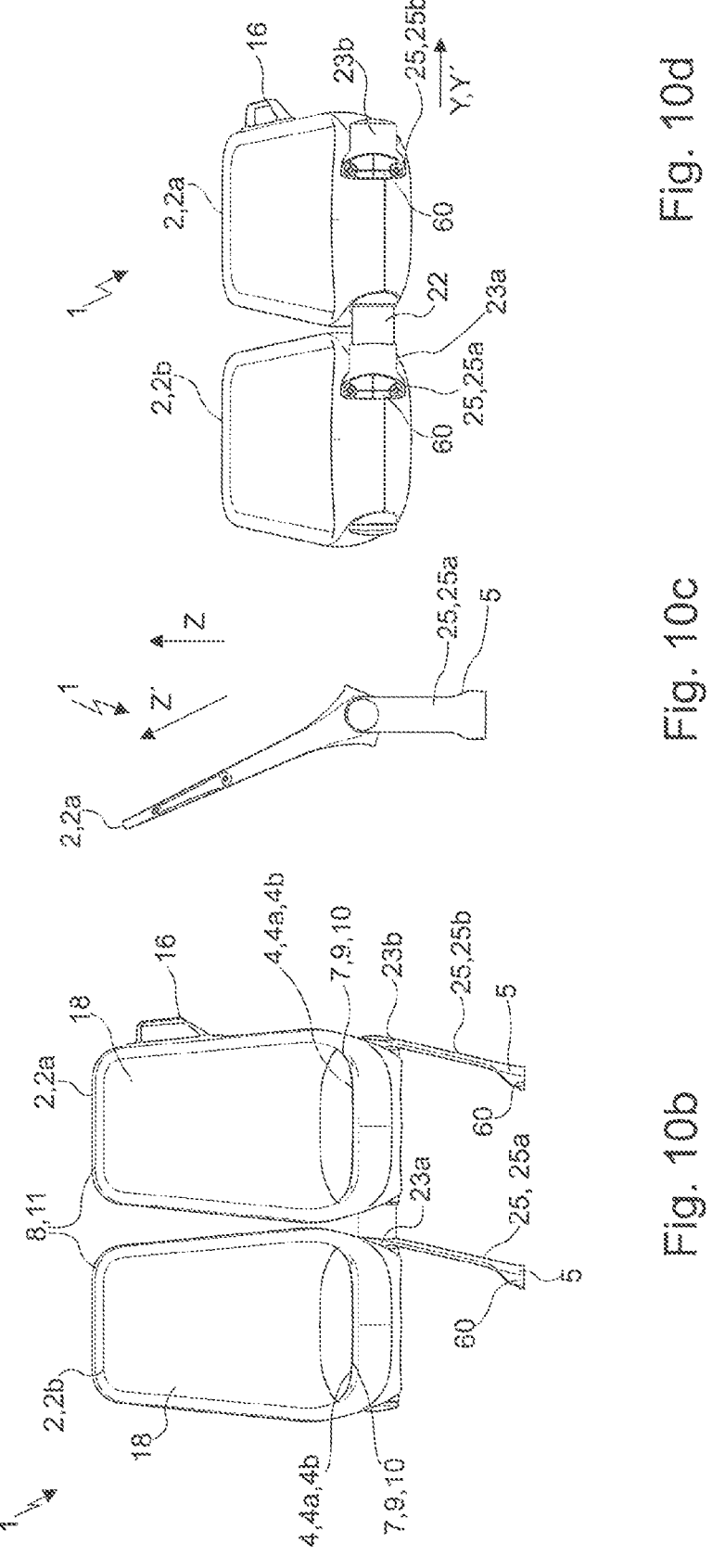

In the embodiments according to FIGS. 7 to 10d, two fastening elements in form of arm elements 25, 25a, 25b are provided, on which the receiving devices 23, 23a, 23b are arranged or integrated. FIG. 7 shows a perspective view of a first embodiment. FIG. 8a shows a front view, and FIG. 8b shows a rear view of this first embodiment. FIG. 8c shows a side view, and FIG. 8d shows a bottom view of this first embodiment. FIG. 9 shows a perspective view of a second embodiment. FIG. 10a shows a front view, and FIG. 10b shows a rear view of this second embodiment. FIG. 10c shows a side view, and FIG. 10d shows a bottom view of this second embodiment. In these embodiments according to FIGS. 7 to 10d, both arm elements 25, 25a, 25b are configured as flat profiles and can be fixed on the floor of the means of transport 101. For this purpose, a fastening region 60 is formed on the respective arm element 25, 25a, 25b, which has a portion parallel to the floor of the means of transport. Bores can be provided in this portion, by means of which the fastening is made possible, for example, by a screw connection. The two arm elements 25, 25a, 25b are inclined with respect to a reference axis 61, which runs perpendicular to the first imaginary plane 13. An angle of inclination γ can thus be defined between this reference axis 61 and a central axis 62 of the arm elements 25, 25a, 25b. This is shown by way of example in FIGS. 8a and 9a. The angle of inclination γ lies in a range between 5° and 20°, preferably in a range between 10° and 15°. The second receiving device 23b and the second arm element 25b connected to it are advantageously provided on an outside of the seat arrangement 1, on which a gripping element 16 is also provided on the corresponding frame element 2, 2a, 2b. As a result, the forces introduced into the seat arrangement 1 by the one gripping element 16 can be effectively diverted via the second arm element 25a. The seat arrangement 1 accordingly has an advantageously increased stability on the outside of the seat arrangement 1. As in all of the embodiments presented, the arm elements 25, 25a, 25b and the associated receiving devices 23, 23a, 23b can be designed integrally, in one piece or in multiple pieces. Likewise, the through channels 24 can extend substantially over the entire width of the frame element 2, 2a, 2b or only in portions. In FIG. 8d it can be seen, for example, that the passage channel 24 only extends in portions along the width direction Y'. The two receiving devices 23, 23a, 23b in this case comprise an extension element 63 which extends along the width direction Y' of the frame elements 2, 2a, 2b. The receiving devices 23, 23a, 23b and the corresponding extension element 63 can be formed integrally, in one piece, or in multiple pieces. The extension element associated with the first receiving device 23a extends from the intermediate space between the frame elements 2, 2a, 2b along the second frame element 2b. The extension element associated with the first receiving device 23a extends from the outer side to the intermediate space between the frame elements 2, 2a, 2b along the first frame element 2a. In contrast, the through channel 24 according to the embodiment shown in FIG. 10d extends over a substantial portion of the width direction of the frame elements 2, 2a, 2b. A substantial portion is to be understood as meaning at least half, preferably three quarters, of the total width of the frame element 2, 2a, 2b. In the embodiment according to FIGS. 7 to 8d, a footrest 52 or a footrest element is provided on each arm element 25, 25a, 25b. Starting from the respective arm element 25, 25a, 25b, this footrest 52 extends substantially parallel to the first imaginary plane 13, or rather the floor of the means of transport. Furthermore, the footrest 52 is designed substantially as a flat profile which is designed integrally or in one piece with the respective arm element 25, 25a, 25b.

According to an embodiment according to FIGS. 12a to 12d, the first receiving devices 23, 23a and the second receiving devices 23, 23a, 23b of the fastening device 5 are arranged on the outer sides of the seat arrangement 1. The two frame elements 2, 2a, 2b are thus arranged between the receiving devices 23, 23a, 23b. Only a preferably sleeve-shaped spacer element 64 is provided between the two frame elements 2, 2a, 2b. This fastening device 5 is designed analogously to the fastening device according to FIGS. 2a and 2b. The corresponding description is therefore analogous. The two arched S-shaped or V-shaped fastening element 25 in the form of arm elements 25a, 25b likewise open into a base element 26. In a middle or lower region of the arm elements 25a, 25b, these are inclined with respect to a reference axis 61 which runs perpendicular to the first imaginary plane 13. An angle of inclination γ can thus be defined between this reference axis 61 and a central axis 62 of the arm elements 25, 25a, 25b. This angle of inclination γ is dependent on the ratio of the widthwise extension of the base element 26 and the widthwise extension of the mounting shaft 22. The angle of inclination γ is in a range between 5° and 60°, preferably in a range between 10° and 50°. An advantageous symmetrical introduction of force into the base element 26 can thus also take place. Analogously, a rotating device can also be provided, by means of which the seat arrangement 1 can be rotated about a rotation axis 54. This embodiment can furthermore have the same further configurations and advantages as the embodiments in FIGS. 1a to 2b and 4.

Figure 19:
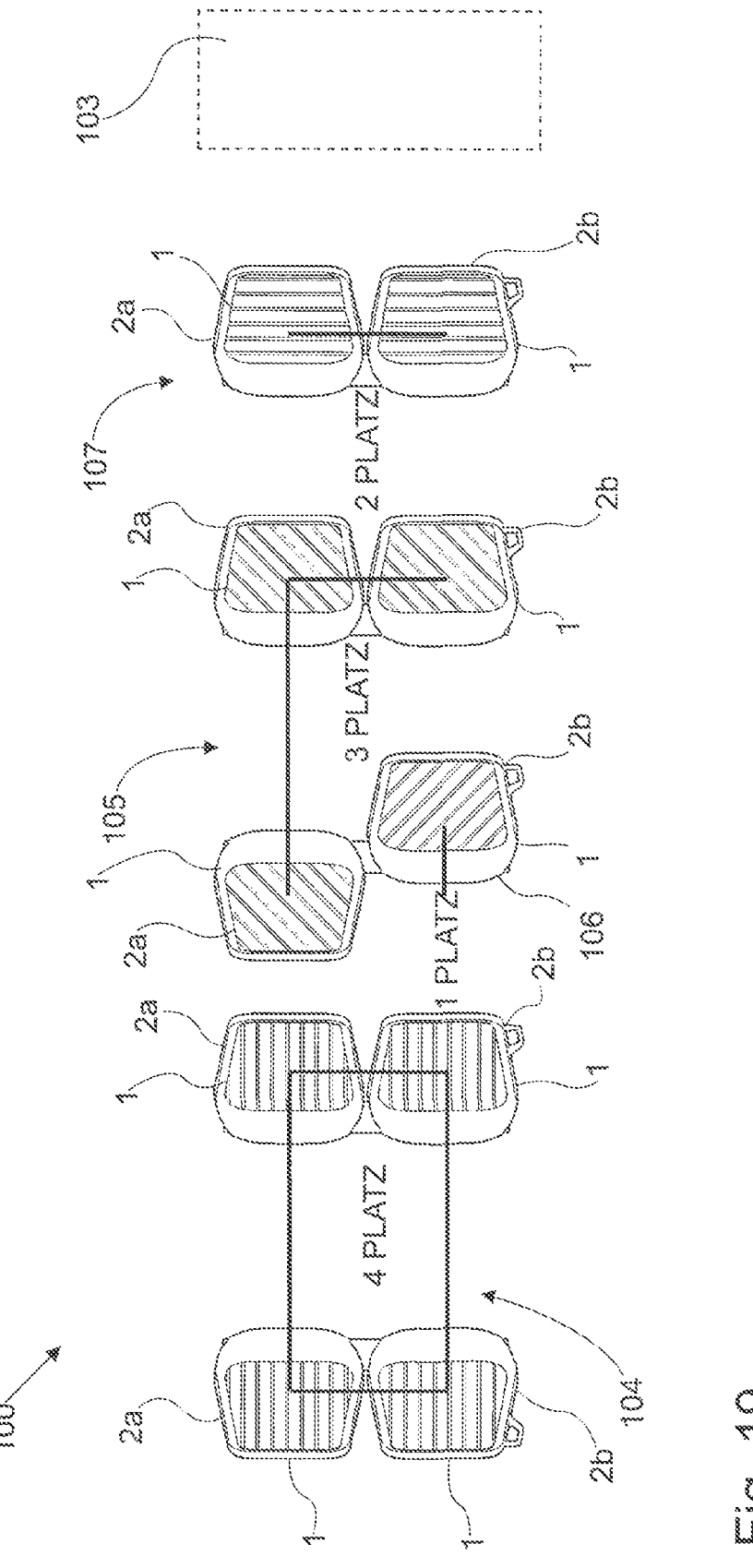
FIG. 19 an interior device of a means of transport.

An interior device 100 for a means of transport 101 is shown in FIG. 19. This interior device 100 comprises a plurality of seat arrangements 1. These seat arrangements 1 are firmly fixed to the floor of the means of transport 101 or are guided in a guide system (not shown). This guide system can be, for example, a rail device and is preferably arranged on the floor of the means of transport 101. Alternatively, a guide system could be provided on a wall element of the means of transport 101. A specific number of seat arrangements 1 could thus initially be stored in a stowage region 103 of the means of transport 101. Depending on requirements, the required number of seat arrangements 1 can be distributed from the stowage region 103 along the guide system 102 in the interior of the means of transport 101. This can be done manually or by an actuator. These seating options should be able to be modified to meet different needs. Such needs are, for example, the adjustment of the seat orientation with respect to the direction of travel or the adjustment of facing seating groups. If baggage or bulky baggage is present, fewer seat arrangements 1 can accordingly be removed from the stowage region. Such an interior device 100 having the seat arrangements 1 can provide more than 25% more seats than the previous seat arrangement. In the first pivoting position 12a, that is to say the upright orientation, the seat arrangements 1 along the depth axis X only assume the depth of the seat portion 4 of the frame element 2, 2a, 2b. The seat arrangements 1 can therefore be stored in an extremely space-saving manner. Also in the second and third pivoting positions 12b, 12c, the seat arrangements 1 have a considerably smaller space requirement in a depth direction X. The space requirement in the depth direction is determined by the angle of inclination $\alpha$, $\beta$ and the foot space required. The user assumes a sitting posture in the seat arrangement 1, which approximately corresponds to a standing posture. This sitting posture, however, has a considerably lower space requirement than the conventional sitting posture, in which the legs are angled at approximately right angles. The seat arrangements 1 advantageously allow an extremely comfortable adjustment of the seat orientation due to their pivotability. This means that seating groups can also be easily modified. This is shown by way of example in FIG. 19. The seat arrangements 1 each have two frame elements 2, 2a, 2b. A first seating group 104 is a group of four. The two frame elements 2, 2a, 2b of two successive seat arrangements 1 are inclined in such a way that two users face each other. A second seating group 105 is a group of three. Here, a frame element 2a is oriented such that the user faces a seat arrangement with two frame elements 2a, 2b. The remaining frame element 2b is used as a single space 106. In a third seating group 107, the seat arrangement 1 is used as a two-seater. In this case, both frame elements 2a, 2b are inclined or aligned in the same direction.

LIST OF REFERENCE SIGNS

1 Seat arrangement
2 Frame element
2a First frame element
2b Second frame element
3 Upper region
4 Seat region
4a First seat region
4b Second seat region
5 Fastening device
6 Pivot axis
7 Lower portion
8 Upper portion
9 First transverse portion
10 Second transverse portion
11 Third transverse portion
12a First pivoting position
12b Second pivoting position
12c Third pivoting position
13 First imaginary plane
14 Second imaginary plane
15 Double arrow
16 Gripping element
17 Additional element
18 Seat cover
19 First region of the seat cover
20 Second region of the seat cover
21 Three-dimensional deformation 22 Mounting shaft
23 Receiving device
23a First receiving device
23b Second receiving device
24 Through channel
24a Inner surface of the through channel
25 Arm element
25a First arm element
25b Second arm element
26 Base element
27 Strut elements
28 Inner surface of the frame element
29 Latching apparatus
30 First stop element
30a Inner surface of the stop element
30b First stop surface
30c Second stop surface
31 Second stop element
31a Inner surface of the stop element
31b First stop surface
31c Second stop surface
32a First further stop element
32b Second further stop element
33 Lateral surface
34 Outer regions of the lateral surface
35 Circumferential direction
36 Radius
37 Radius
38 Holding element
38a Opening of the holding element
38b Collar
38c First recess region
38d Second recess region
38e Guide
39 Operating element
39a First support portion
39b Second support portion
39c First operating portion
39d Second operating portion
40 Mounting elements
41 Shaft
42 First locking element 4
43 Reset device
44 Circumferential direction
45 Radial direction
46 Further locking element
47 Imaginary circular arc
48a Upper opening side
48b Lower opening side
49 Third region of the seat cover
50 Cut-out in the seat cover
51 Cover element
52 Footrest
53 Distance
54 Rotation axis
55 Double arrow
56 First plate-like element
57 Second plate-like element
58 Fastening plane
59 Third plate-like element
60 Fastening region
61 Reference axis
62 Central axis
63 Extension element
64 Spacer
100 Interior device of the means of transport
101 Means of transport

102 Floor of the means of transport
103 Stowage region
104 First seating group
105 Second seating group
106 Single seat
107 Third seating group
X Depth axis of the seat arrangement
Y Width axis of the seat arrangement
Z Height axis of the seat arrangement
X' Depth axis of the at least one frame element
Y' Width axis of the at least one frame element
Z' Height axis of the at least one frame element
What is claimed is:

1. A seat arrangement for a means of transport, comprising:

a fastening device, the fastening device including a fastening element in a form of an arm element that at least partially extends along a height axis;

a first receiving device, wherein the first receiving device is joined to the arm element of the fastening device;

a second receiving device, wherein the first and second receiving devices are part of the fastening device;

first and second frame elements, wherein the first and second frame elements are arranged next to one another along a width axis, wherein the first receiving device is between the first and second frame elements, and wherein the second receiving device is on a side of one of the frame elements opposite a side on which the first receiving device is disposed; and only one mounting shaft, wherein the mounting shaft is received in at least the first receiving device, wherein the mounting shaft connects the first and second frame elements to the fastening device, wherein the mounting shaft extends at least over an entire width of the first and second frame elements within a channel disposed in the first and second frame elements, wherein the mounting shaft is received in at least the first and second receiving devices of the fastening device, and wherein the first and second frame elements comprise an upper region for supporting the back and at least one seat region integrated in the first and second frame elements.

2. The seat arrangement according to claim 1, wherein the seat region is arranged at a height between 40 cm and 150 cm.

3. The seat arrangement according to claim 1, wherein a lower portion and an upper portion form at least one of the first and second frame elements, wherein the lower portion comprises at least one first transverse portion extending substantially along a width axis (Y', Y) and one second transverse portion extending substantially along a width axis (Y', Y), wherein the upper portion comprises a third transverse portion extending along the width axis (Y', Y), wherein the first transverse portion and the second transverse portion have an enlarged extent along a depth axis (X'), wherein the first transverse portion or the second transverse portion forms a seat region at least in portions, and wherein the lower portion and the upper portion of the at least one of the first frame and second elements form the at least one of the first and second frame elements integrally, in one piece, or in multiple pieces.

4. The seat arrangement according to claim 1, wherein at least one of the first and second frame elements can be pivoted relative to the fastening device about a pivot axis extending along a width axis (Y), wherein at least one of the first and second frame elements is pivotable into at least two pivoting positions, wherein at least one of the first and second frame elements is pivotable into three pivoting positions, wherein at least one of the first and second frame elements is pivotable into a first pivoting position, wherein the at least one of the first and second frame elements extends substantially perpendicular to a first imaginary plane that extends parallel to a floor of the means of transport in the first pivoting position, wherein the at least one of the first and second frame elements is pivotable into a second pivoting position, which is inclined relative to the first pivoting position by a first angle of inclination ($\alpha$), wherein the at least one of the first frame and second elements is pivotable into a third pivoting position, which is inclined relative to the first pivoting position by a second angle of inclination ($\beta$), wherein the at least one of the first and second frames element is inclined in directions opposite along a depth axis (X) in the second pivoting position and the third pivoting position, and wherein the first angle of inclination ($\alpha$) and the second angle of inclination ($\beta$) preferably have the same amount.

5. The seat arrangement according to claim 4, wherein in the second pivoting position of at least one of the first and second frame elements, a first seat region is formed at least by a first transverse portion, wherein, in the third pivoting position of the first frame element, a second seat region is formed at least by a second transverse portion, wherein, in the second pivoting position of at least one of the first and second frame elements, the first seat region extends substantially parallel to the first imaginary plane, and wherein, in the third pivoting position of at least one of the first and second frame element, the second seat region extends substantially parallel to the first imaginary plane.

6. The seat arrangement according to claim 1, wherein the first and second frame elements can be pivoted independently of one another about a common pivot axis extending along a width axis (Y) relative to the fastening device.

7. The seat arrangement according to claim 1, wherein each of the receiving devices is arranged on a fastening element, and wherein the mounting shaft is non-rotatably connected to the fastening device.

8. The seat arrangement according to claim 4, wherein the second receiving device is arranged on a fastening element, which can be arranged on the means of transport by a first plate-like element, wherein the first plate-like element is arranged within a fastening plane, and wherein the fastening plane extends substantially parallel to an imaginary plane that is substantially perpendicular to the first imaginary plane.

9. The seat arrangement according to claim 8, wherein the fastening element in the form of an arm element is designed as a cantilever, wherein the arm element extends from the first receiving device to the fastening plane and ends in a second plate-like element that is arranged within the fastening plane, and wherein starting from the second plate-like element, a lower cantilevered portion of the arm element extends obliquely upwards along the height axis (Z).

10. The seat arrangement according to claim 9, wherein the first plate-like element and the second plate-like element are merged into a third plate-like element.

11. The seat arrangement according to claim 1, wherein the fastening device includes two fastening elements in the form of an arm element that extends along a height axis, wherein the first receiving device is joined to a first arm element of the fastening device that at least partially extends along a height axis, and wherein the second receiving device is joined to a second arm element of the fastening device that at least partially extends along a height axis.

12. The seat arrangement according to claim 11, wherein the first and second arm elements are inclined with respect to a reference axis that runs perpendicular to a first imaginary plane, wherein an angle of inclination ($\gamma$) is defined between the reference axis and a central axis of the arm elements, and wherein the angle of inclination ($\gamma$) lies in a range between 5° and 20°.

13. The seat arrangement according to claim 11, wherein a footrest is provided on each of the first and second arm elements, wherein starting from the respective arm element the footrest extends substantially parallel to a first imaginary plane, and wherein the footrest has a substantially flat profile that is integral to or in one piece with the respective arm element.

14. Interior device of a means of transport, in particular a means of passenger transport, comprising at least one seat arrangement according to claim 1, wherein at least one seat arrangement is arranged on the means of transport in a stationary manner or displaceable by means of a guide device.

15. A seat arrangement for a means of transport, comprising:
a fastening device, the fastening device including a fastening element in a form of an arm element that at least partially extends along a height axis;
a first receiving device, wherein the first receiving device is joined to the arm element of the fastening device;
a second receiving device;
first and second frame elements, wherein the first and second frame elements are arranged next to one another along a width axis, wherein the first receiving device is between the first and second frame elements, and wherein the second receiving device is on a side of one of the frame elements opposite a side on which the first receiving device is disposed; and
at least one mounting shaft, wherein the at least one mounting shaft is received in at least the first receiving device, and wherein only one mounting shaft connects the first and second frame elements to the fastening device,
wherein a lower portion and an upper portion form at least one of the first and second frame elements, wherein the lower portion comprises at least one first transverse portion extending substantially along a width axis and one second transverse portion extending substantially along the width axis, wherein the upper portion comprises a third transverse portion extending along the width axis, wherein the first transverse portion and the second transverse portion have an enlarged extent along a depth axis, wherein the first transverse portion or the second transverse portion forms a seat region at least in portions, and wherein the lower portion and the upper portion of the at least one of the first frame and second elements form the at least one of the first and second frame elements integrally, in one piece, or in multiple pieces.

16. The seat arrangement according to claim 15, wherein the first and second frame elements comprise an upper region for supporting a back and at least one seat region integrated in the first frame element, and wherein the seat region is arranged at a height between 40 cm and 150 cm.

17. The seat arrangement according to claim 15, wherein at least one of the first and second frame elements can be pivoted relative to the fastening device about a pivot axis extending along the width axis (Y), wherein at least one of the first and second frame elements is pivotable into at least two pivoting positions, wherein at least one of the first and second frame elements is pivotable into three pivoting positions, wherein at least one of the first and second frame elements is pivotable into a first pivoting position, wherein the at least one of the first and second frame elements extends substantially perpendicular to a first imaginary plane that extends parallel to a floor of the means of transport in the first pivoting position, wherein the at least one of the first and second frame elements is pivotable into a second pivoting position, which is inclined relative to the first pivoting position by a first angle of inclination ($\alpha$), wherein the at least one of the first and second frame elements is pivotable into a third pivoting position, which is inclined relative to the first pivoting position by a second angle of inclination ($\beta$), wherein the at least one of the first and second frame elements is inclined in directions opposite along a depth axis (X) in the second pivoting position and the third pivoting position, wherein the first angle of inclination ($\alpha$) and the second angle of inclination ($\beta$) preferably have the same amount, and wherein the first and second frame elements can be pivoted independently of one another about a common pivot axis extending along the width axis (Y) relative to the fastening device.

18. The seat arrangement according to claim 17, wherein in the second pivoting position of at least one of the first and second frame elements, a first seat region is formed at least by the first transverse portion, wherein, in the third pivoting position of the first frame element, a second seat region is formed at least by the second transverse portion, wherein, in the second pivoting position of at least one of the first and second frame elements, the first seat region extends substantially parallel to the first imaginary plane, and wherein, in the third pivoting position of at least one of the first and second frame elements, the second seat region extends substantially parallel to the first imaginary plane.

19. The seat arrangement according to claim 17, wherein the second receiving device is arranged on a fastening element, which can be arranged on the means of transport by a first plate-like element, wherein the first plate-like element is arranged within a fastening plane, wherein the fastening plane extends substantially parallel to an imaginary plane that is substantially perpendicular to the first imaginary plane, wherein the fastening element in the form of an arm element is designed as a cantilever, wherein the arm element extends from the first receiving device to the fastening plane and ends in a second plate-like element that is arranged within the fastening plane, and wherein starting from the second plate-like element, a lower cantilevered portion of the arm element extends obliquely upwards along a height axis (Z).

20. The seat arrangement according to claim 19, wherein the first plate-like element and the second plate-like element are merged into a third plate-like element.

21. The seat arrangement according to claim 15, wherein the fastening device includes two fastening elements in the form of an arm element that extends along a height axis, wherein the first receiving device is joined to a first arm element of the fastening device that at least partially extends along a height axis, and wherein the second receiving device is joined to a second arm element of the fastening device that at least partially extends along a height axis.

22. The seat arrangement according to claim 21, wherein the first and second arm elements are inclined with respect to a reference axis that runs perpendicular to a first imaginary plane, wherein an angle of inclination (γ) is defined between the reference axis and a central axis of the arm elements, wherein the angle of inclination (γ) lies in a range between 5° and 20°, wherein a footrest is provided on each of the first and second arm elements, wherein starting from the respective arm element the footrest extends substantially parallel to the first imaginary plane, and wherein the footrest has a substantially flat profile that is integral to or in one piece with the respective arm element.

\* \* \* \* \*